US012166957B2

(12) United States Patent
Kim et al.

(10) Patent No.: US 12,166,957 B2
(45) Date of Patent: Dec. 10, 2024

(54) GENERATING AND DISPLAYING CONTENT BASED ON RESPECTIVE POSITIONS OF INDIVIDUALS

(71) Applicant: Apple Inc., Cupertino, CA (US)

(72) Inventors: Seung Wook Kim, San Jose, CA (US); Zachary D. Corley, Sunnyvale, CA (US); Edwin Iskandar, San Jose, CA (US); Felipe Bacim de Araujo e Silva, San Jose, CA (US); Karol E. Czaradzki, Mountain View, CA (US); Pavel V. Dudrenov, San Francisco, CA (US); Alfred B. Huergo Wagner, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 119 days.

(21) Appl. No.: 17/990,141

(22) Filed: Nov. 18, 2022

(65) Prior Publication Data

US 2023/0370578 A1  Nov. 16, 2023

Related U.S. Application Data

(63) Continuation of application No. 17/887,830, filed on Aug. 15, 2022, now abandoned.

(Continued)

(51) Int. Cl.
H04N 13/368 (2018.01)
G06T 15/20 (2011.01)
(Continued)

(52) U.S. Cl.
CPC .......... H04N 13/368 (2018.05); G06T 15/20 (2013.01); H04N 13/279 (2018.05); H04N 13/305 (2018.05)

(58) Field of Classification Search
CPC .. H04N 13/368; H04N 13/279; H04N 13/305; G06T 15/20
See application file for complete search history.

(56) References Cited

U.S. PATENT DOCUMENTS 9,715,827 B2 *  7/2017  Ng ........................ G08G 1/0175
2017/0358140 A1 * 12/2017  Kohler ............... G02B 27/0172
2021/0099692 A1    4/2021  Kim et al.

FOREIGN PATENT DOCUMENTS

TW    I724858 B  *  4/2021

OTHER PUBLICATIONS

Red ("Human Eyesight & 4K Viewing", 2020, https://web.archive.org/web/20201111215358/https://www.red.com/red-101/eyesight-4k-resolution-viewing ) (Year: 2020).*

* cited by examiner

Primary Examiner — Xin Sheng
(74) Attorney, Agent, or Firm — Fernando & Partners, LLP

(57) ABSTRACT

In some implementations, a method is performed at an electronic device including one or more processors, a non-transitory memory, a rendering system, and a display. The method includes determining a first rendering characteristic based on a first viewing angle of a first individual with respect to the display. The method includes determining a second rendering characteristic based on a second viewing angle of a second individual with respect to the display. The first rendering characteristic is different from the second rendering characteristic. The method includes generating, via the rendering system, first display content data according to the first rendering characteristic, and generating, via the rendering system, second display content data according to the second rendering characteristic. The first display content data is associated with the first viewing angle. The second (Continued)

display content data is associated with the second viewing angle.

20 Claims, 21 Drawing Sheets

Related U.S. Application Data

(60) Provisional application No. 63/233,465, filed on Aug. 16, 2021.

(51) Int. Cl.
*H04N 13/279* (2018.01)
*H04N 13/305* (2018.01)

GENERATING AND DISPLAYING CONTENT BASED ON RESPECTIVE POSITIONS OF INDIVIDUALS

CROSS-REFERENCE TO RELATED APPLICATIONS

This application is a continuation of U.S. Non-Provisional patent application Ser. No. 17/887,830, filed Aug. 15, 2022, which claims priority to U.S. Provisional Patent App. No. 63/233,465, filed on Aug. 16, 2021, which are hereby incorporated by reference in their entireties.

TECHNICAL FIELD

The present disclosure relates to content generation and display, and in particular generating and displaying content based on positions of individuals.

BACKGROUND

A device may generate content, and display the content on a display. At a given point of time, the displayed content may be viewable by multiple individuals. Generation and display of the content is independent of respective positions of the multiple individuals. Accordingly, the device utilizes relatively high rendering resource levels and display resource levels in order to generate and display the content.

SUMMARY

In accordance with some implementations, a method is performed at an electronic device including one or more processors, a non-transitory memory, a rendering system, and a display. The method includes determining a first rendering characteristic based on a first viewing angle of a first individual with respect to the display. The method includes determining a second rendering characteristic based on a second viewing angle of a second individual with respect to the display. The first rendering characteristic is different from the second rendering characteristic. The method includes generating, via the rendering system, first display content data according to the first rendering characteristic, and generating, via the rendering system, second display content data according to the second rendering characteristic. The first display content data is associated with the first viewing angle. The second display content data is associated with the second viewing angle.

In accordance with some implementations, a method is performed at an electronic device including one or more processors, a non-transitory memory, and a display. The method includes obtaining first display content data associated with a first individual, and obtaining second display content data associated with a second individual. The method includes determining a first display operation parameter based on a first viewing angle of the first individual with respect to the display. The method includes determining a second display operation parameter based on a second viewing angle of the second individual with respect to the display. The first display operation parameter is different from the second display operation parameter. The method includes displaying, on the display, the first display content data according to the first display operation parameter, and displaying, on the display, the second display content data according to the second display operation parameter.

In accordance with some implementations, an electronic device includes one or more processors, a non-transitory memory, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
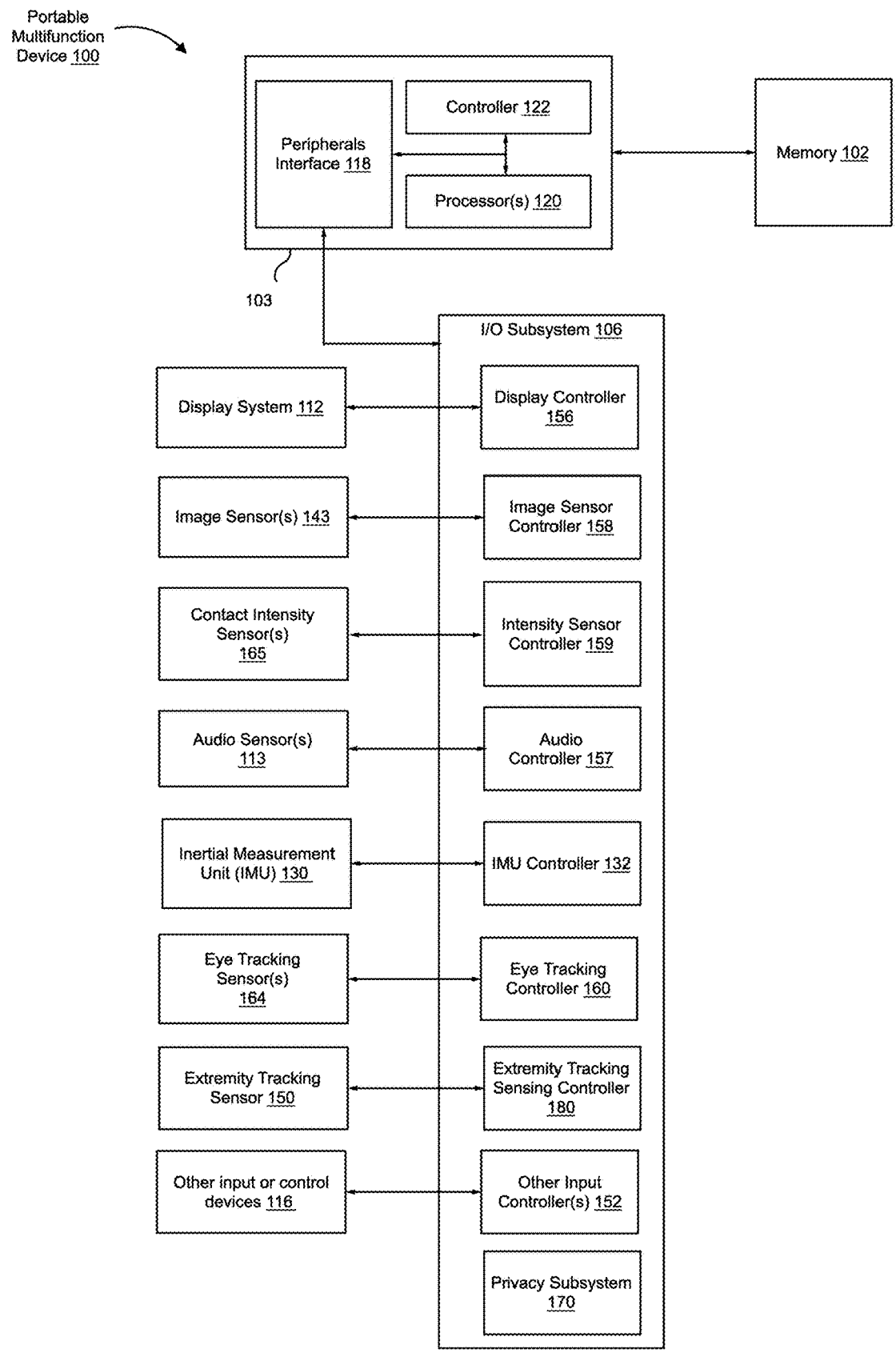
FIG. 1 is a block diagram of an example of a portable multifunction device in accordance with some implementations.

In some circumstances, a display of a device provides a viewable region that includes multiple individuals. Accordingly, the multiple individuals may concurrently view the display. For example, two individuals are positioned relative to the display such that the two individuals can concurrently view content displayed on the display. Moreover, a display including a lenticular lens may display different content to different individuals, based on a corresponding viewing angle between a particular individual and the display. However, the device does not generate or display content based on respective positions of the multiple individuals. Accordingly, the device utilizes relatively high rendering and display resources in connection with generation of and display of the content.

By contrast, various implementations disclosed herein include methods, systems, and electronic devices that generate display content data and/or control display of the display content data, based on respective positions of individuals with respect to the display. For example, a first individual is positioned at a first depth from the display, and a second individual is positioned at a second depth from the display that is larger than the first depth. Accordingly, an electronic device may generate higher resolution display content data for the first individual than for the second individual, because the first individual is closer to the display and thus better suited to appreciate higher resolution display content data. By varying the resolution of generated display content data, the electronic device reduces resource utilization (e.g., reduces graphics processing unit (GPU) processing utilization and memory utilization).

As another example, a first individual is positioned at a first viewing angle with respect to a display, and a second individual is positioned at a second viewing angle with respect to the display that is larger than the first viewing angle. For example, the first individual is horizontally centered with respect to the display (e.g., approximately a zero degree viewing angle), whereas the second individual is positioned near the left edge of the display (e.g., a 40 degree viewing angle). Accordingly, an electronic device displays first display content data for the first individual at a higher display frame rate or at a higher brightness level than with respect to the second display content data for the second individual. By varying the display frame rate or brightness level, the electronic device reduces display resource utilization (e.g., reduces power consumption by the display).

Description

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (e.g., one or more non-transitory computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, audio sensor(s) 113 (e.g., microphone), eye tracking sensor(s) 164, an extremity tracking sensor 150, and other input or control device(s) 116. In some implementations, the electronic device 100 corresponds to one of a mobile phone, tablet, laptop, wearable computing device, and/or the like.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time-of-flight sensor that obtains depth information characterizing a physical object within a physical environment. In some implementations, the other input or control devices 116 include an ambient light sensor that senses ambient light from a physical environment and outputs corresponding ambient light data.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). For example, the image sensor(s) 143 output image data that represents a physical individual within a physical environment.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of a gaze position of the user. In various implementations, the eye tracking data includes data indicative of a fixation point (e.g., point of regard) of the user on a display panel.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
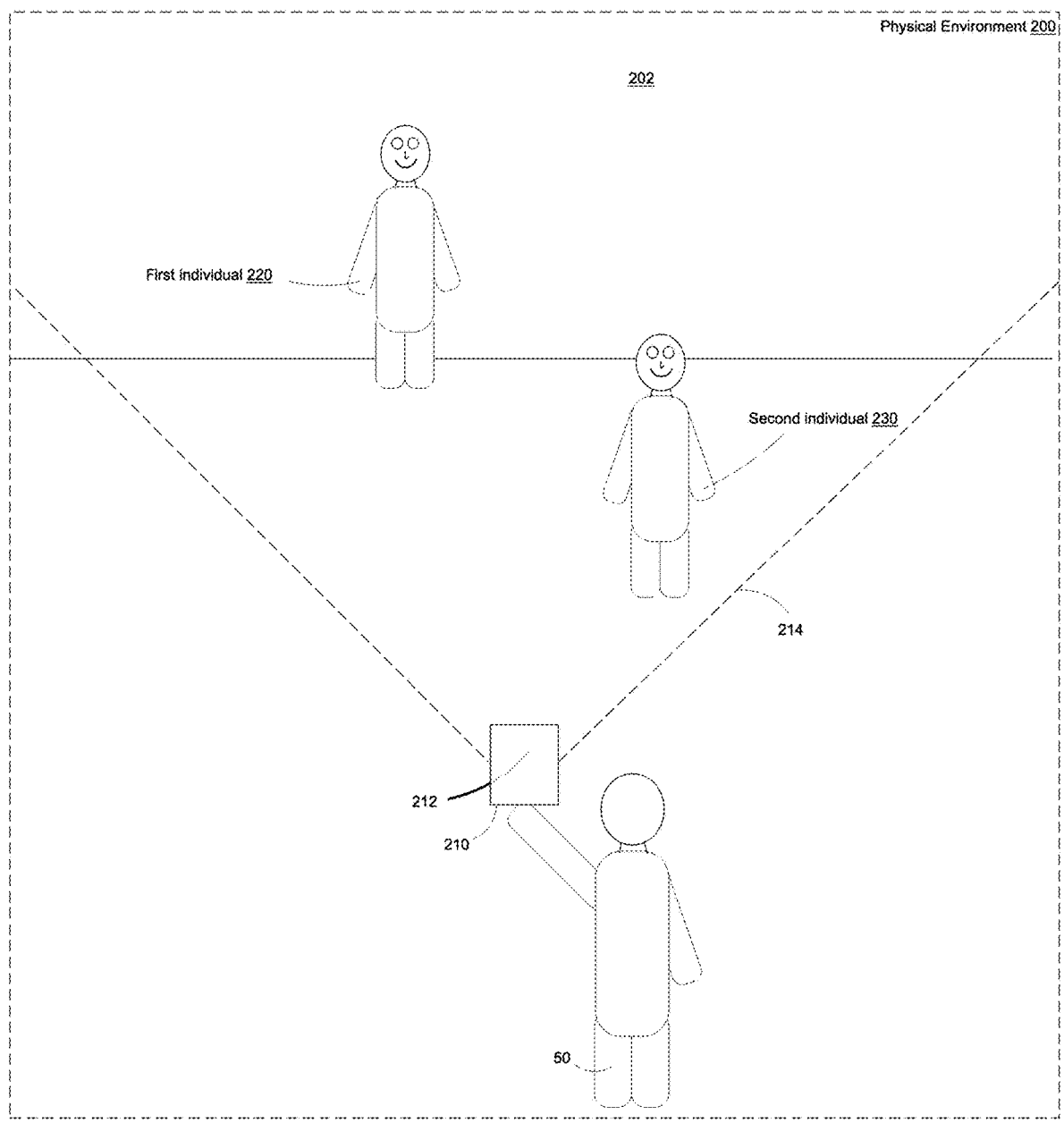
FIGS. 2A-2P are examples of displaying various display content data based on respective positions of individuals in accordance with some implementations.
Figure 2B:
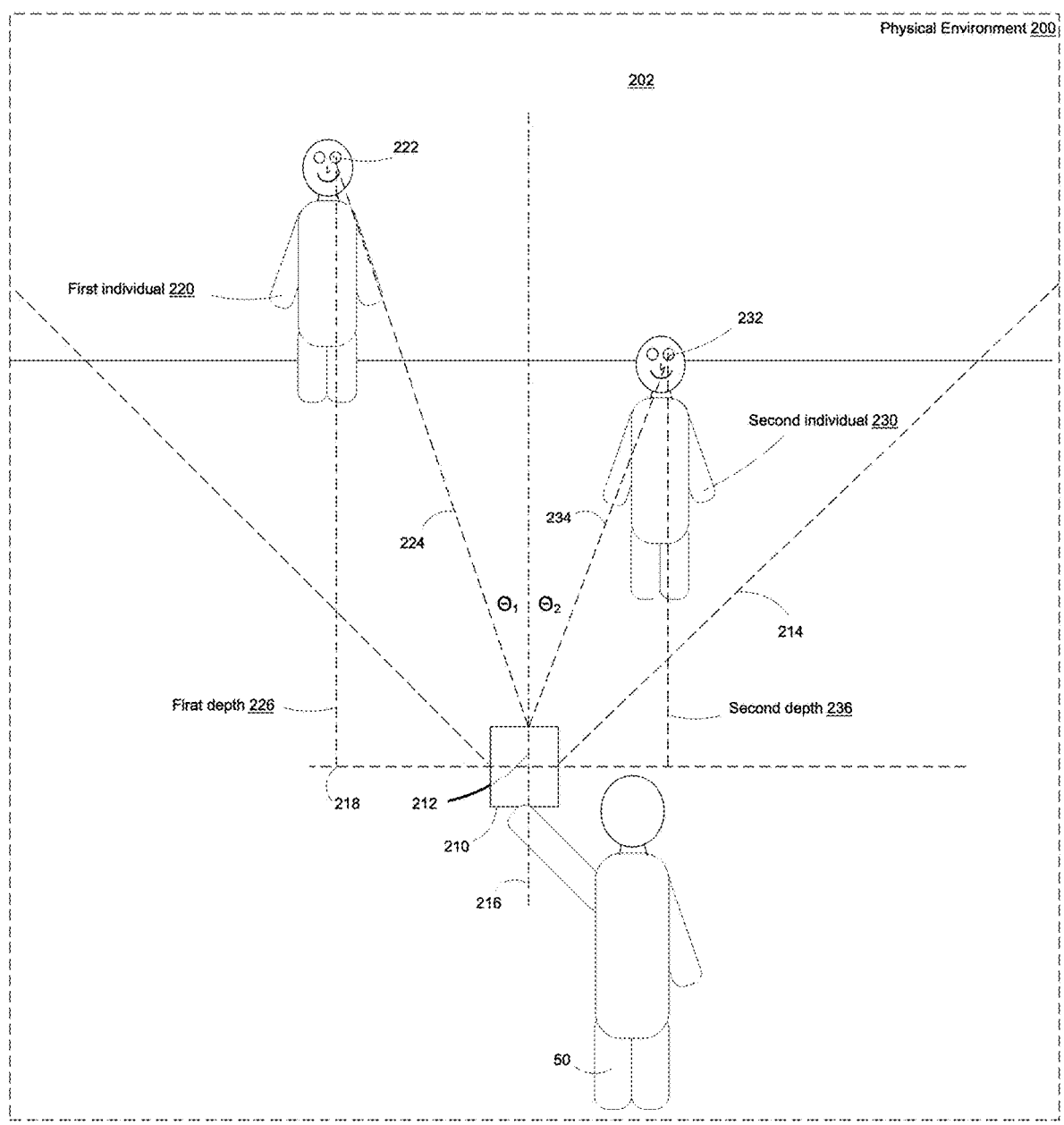
Figure 2C:
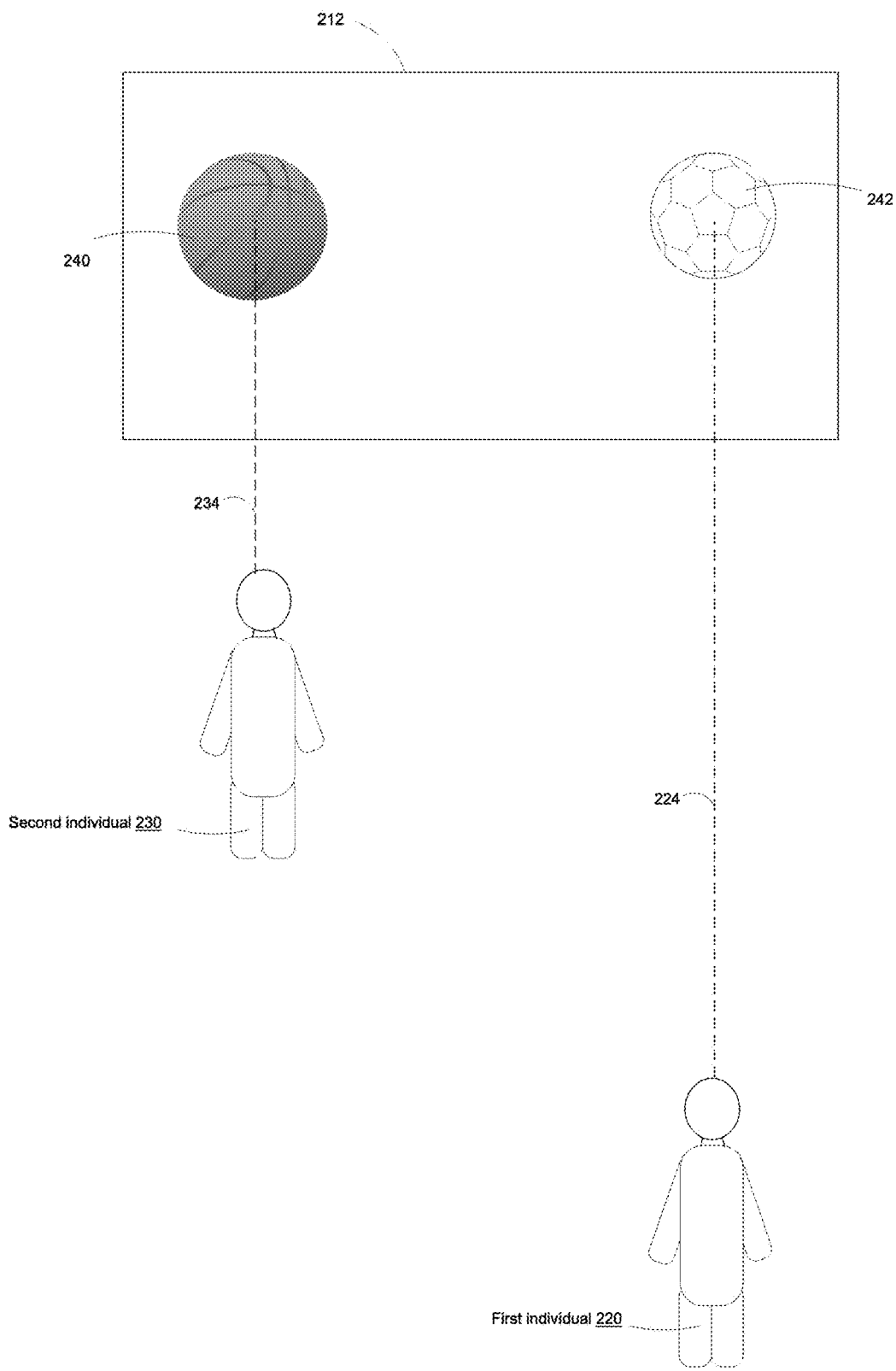
Figure 2D:
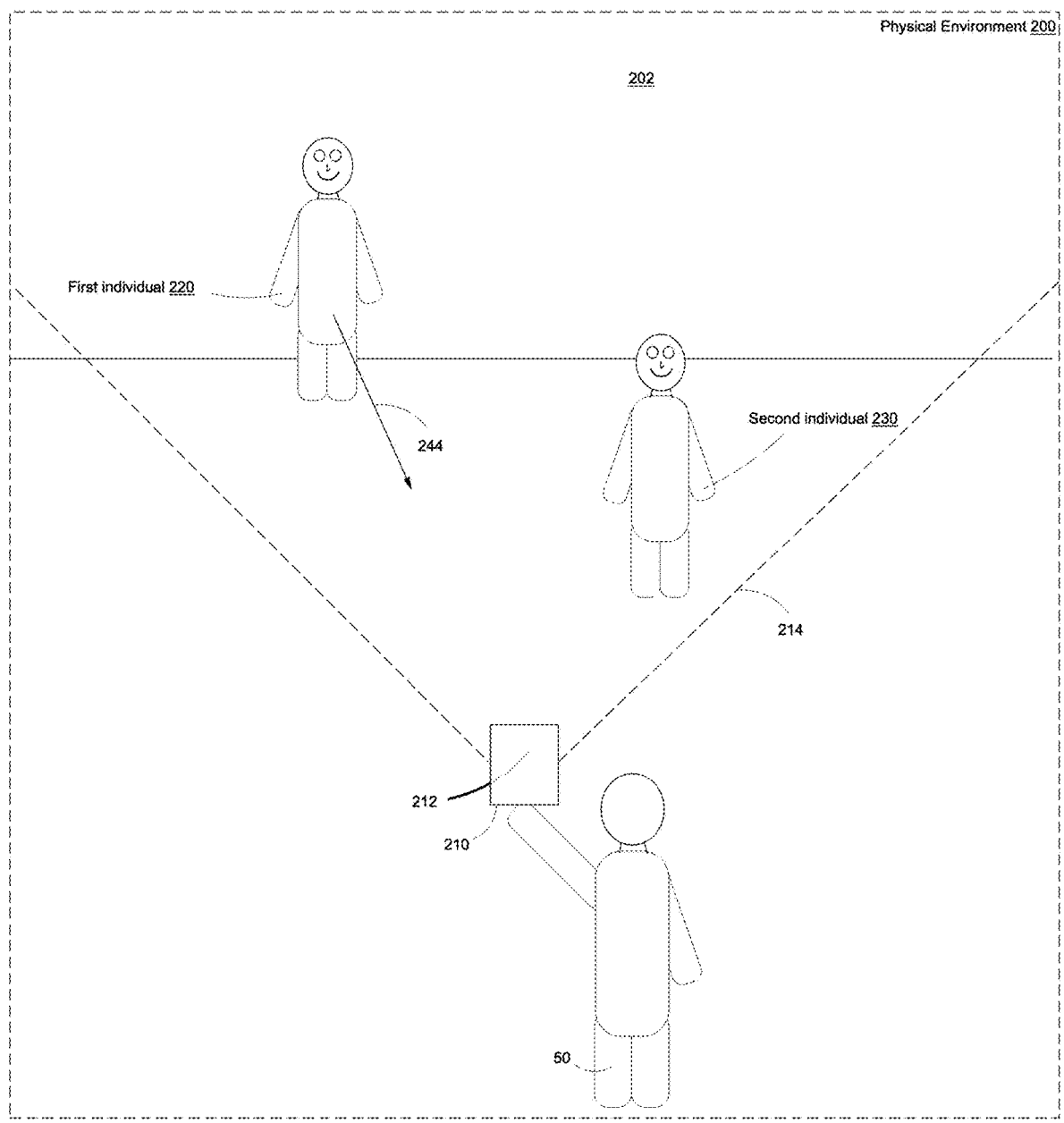
Figure 2E:
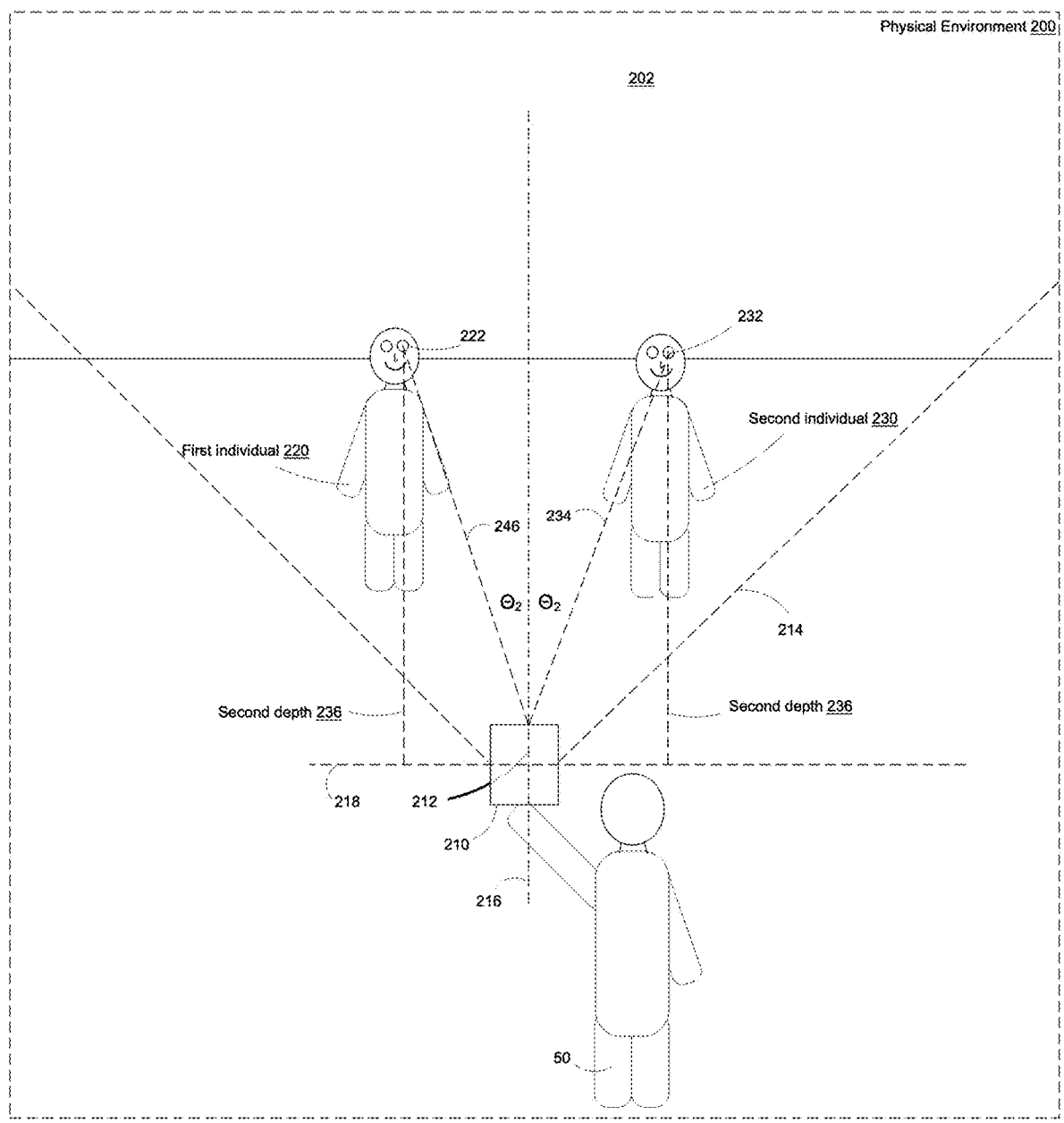
Figure 2F:
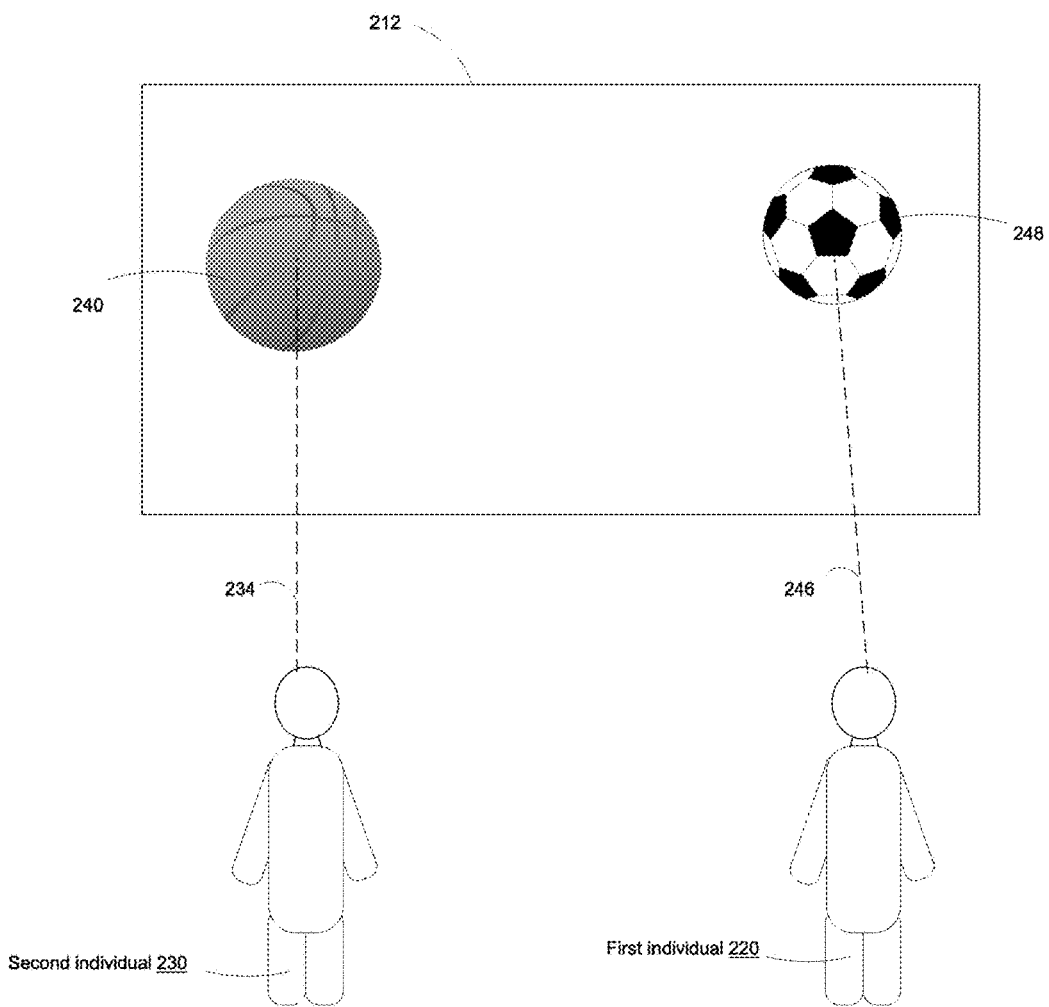
Figure 2G:
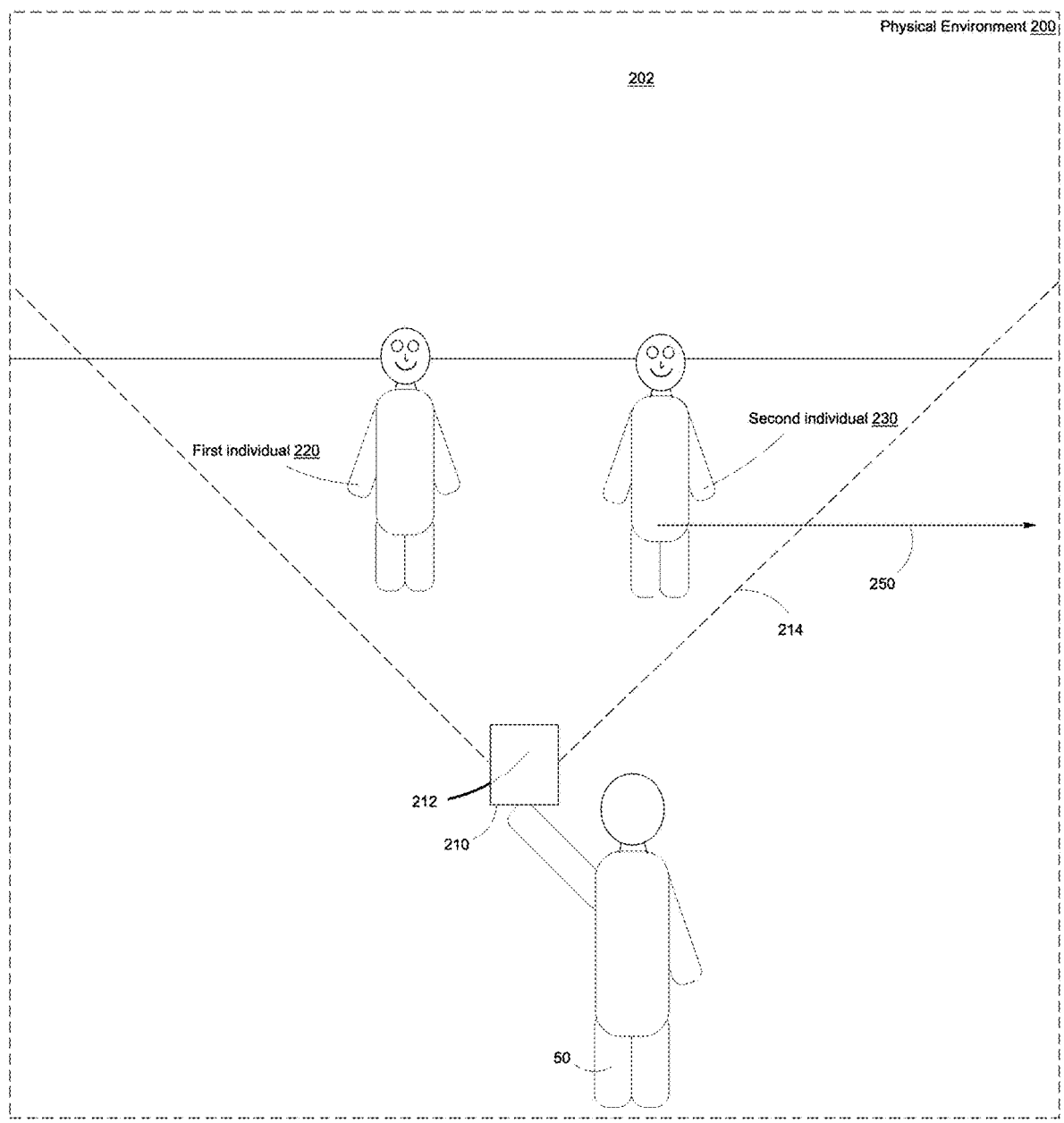
Figure 2H:
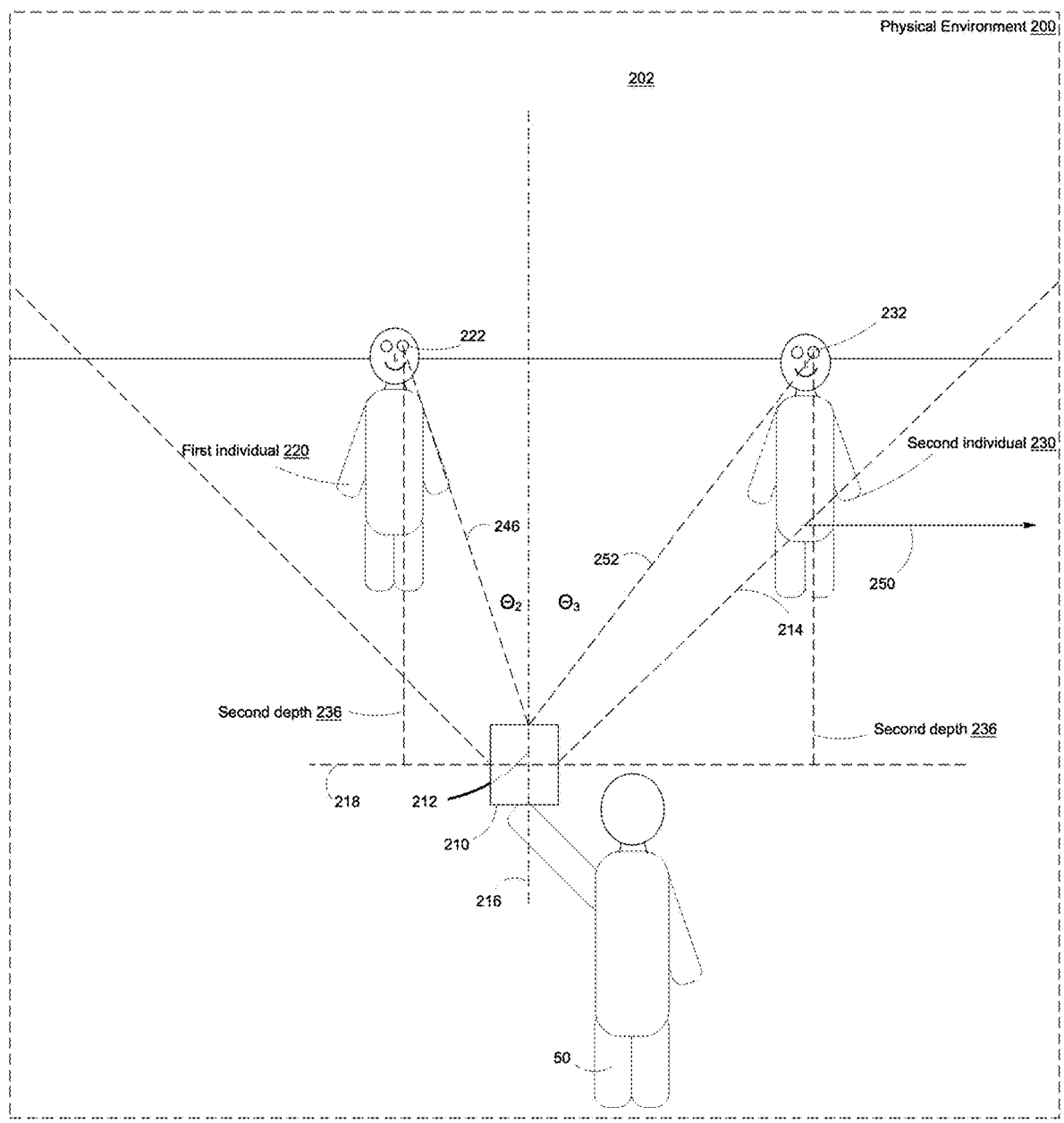
Figure 2I:
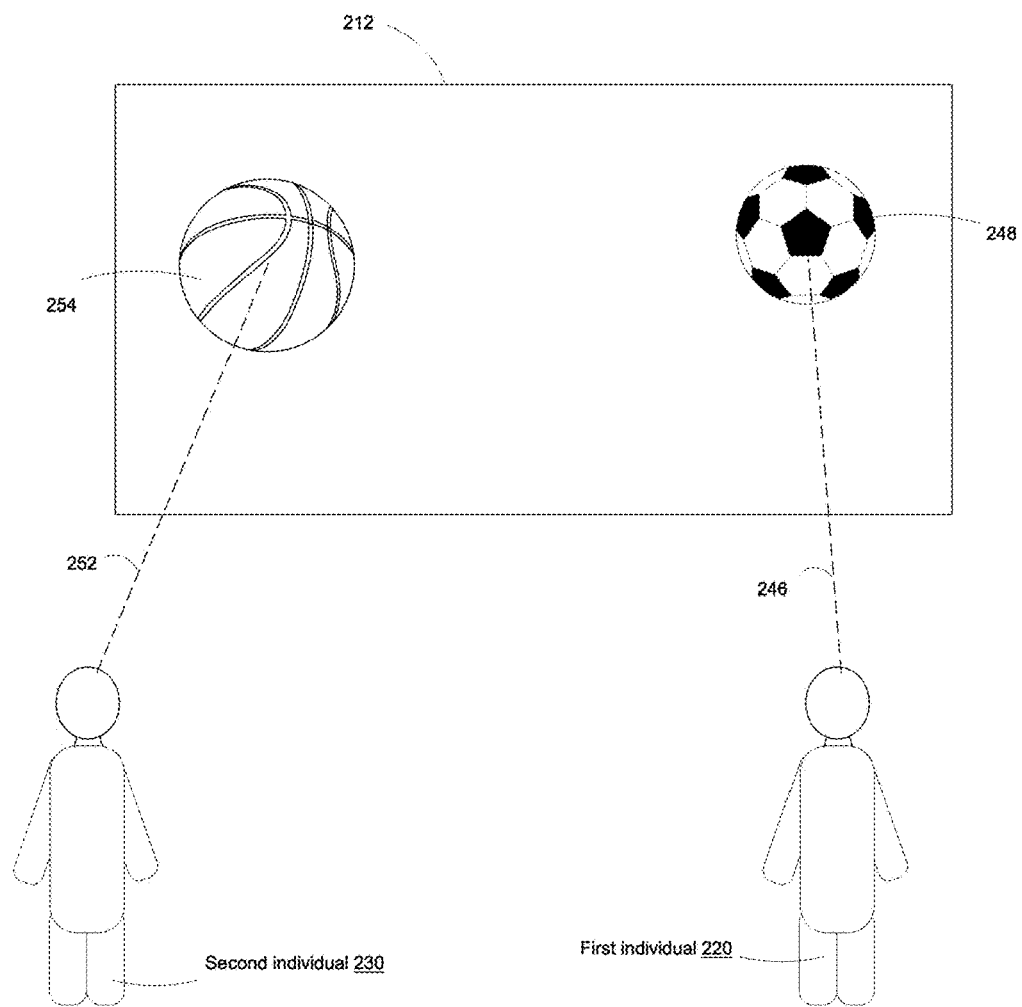
Figure 2J:
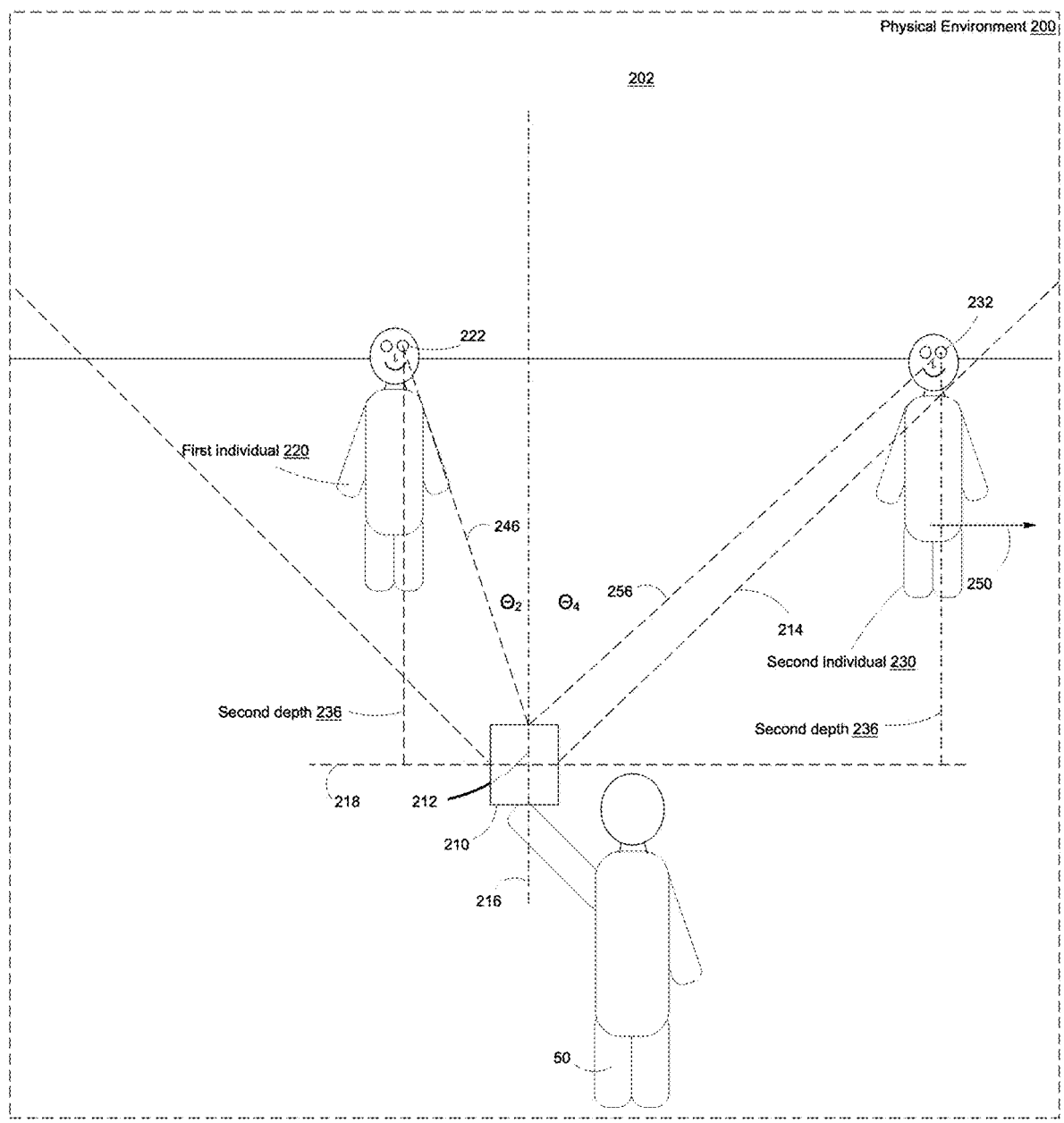
Figure 2K:
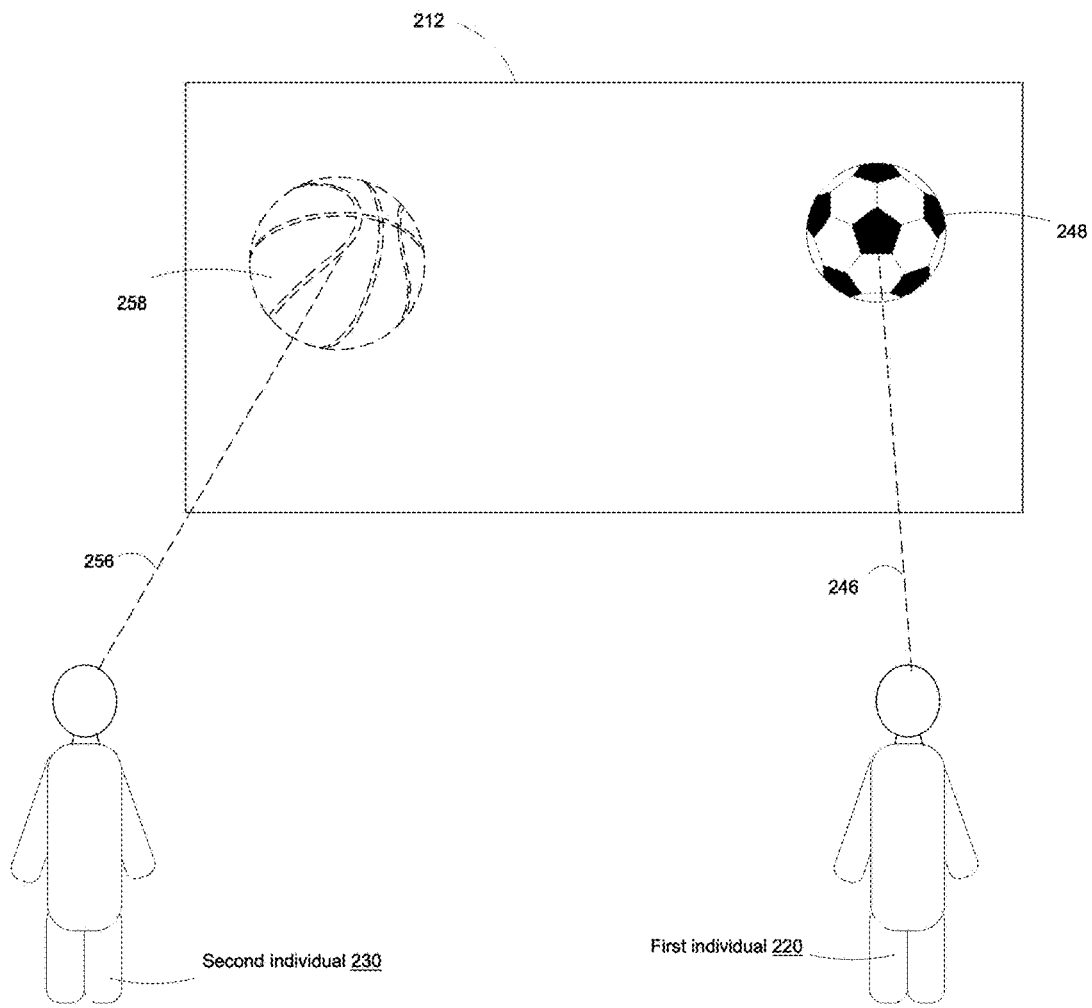
Figure 2L:
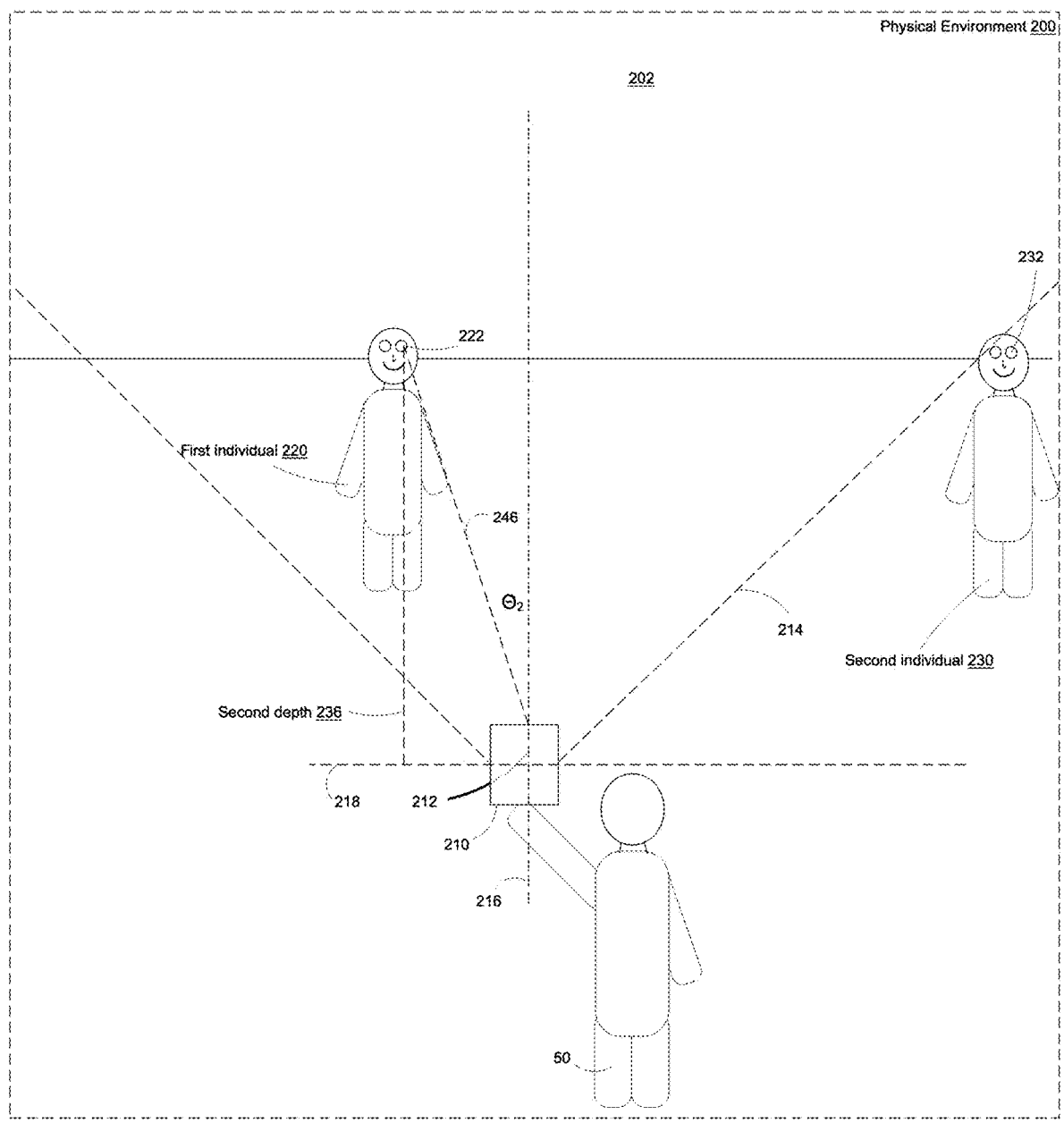
Figure 2M:
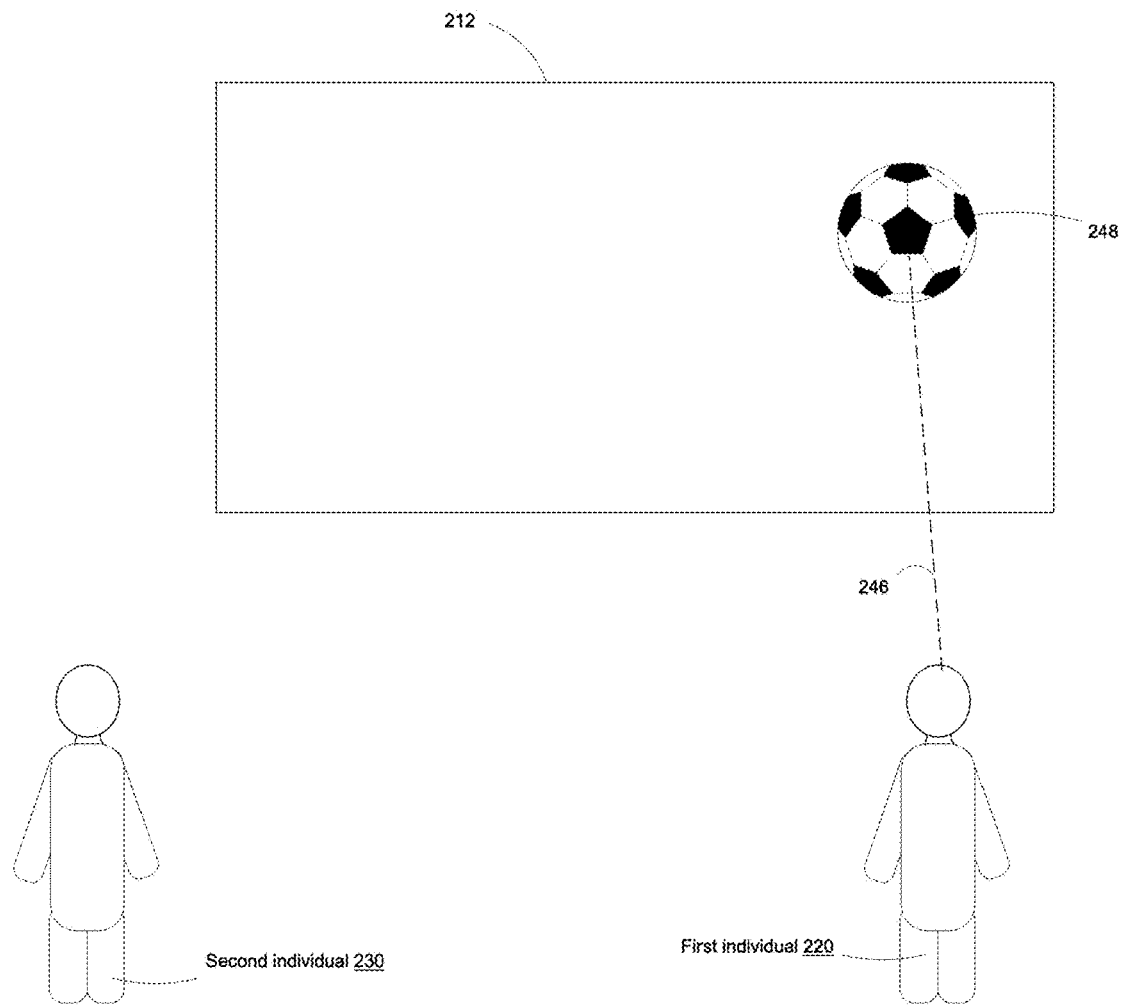
Figure 2N:
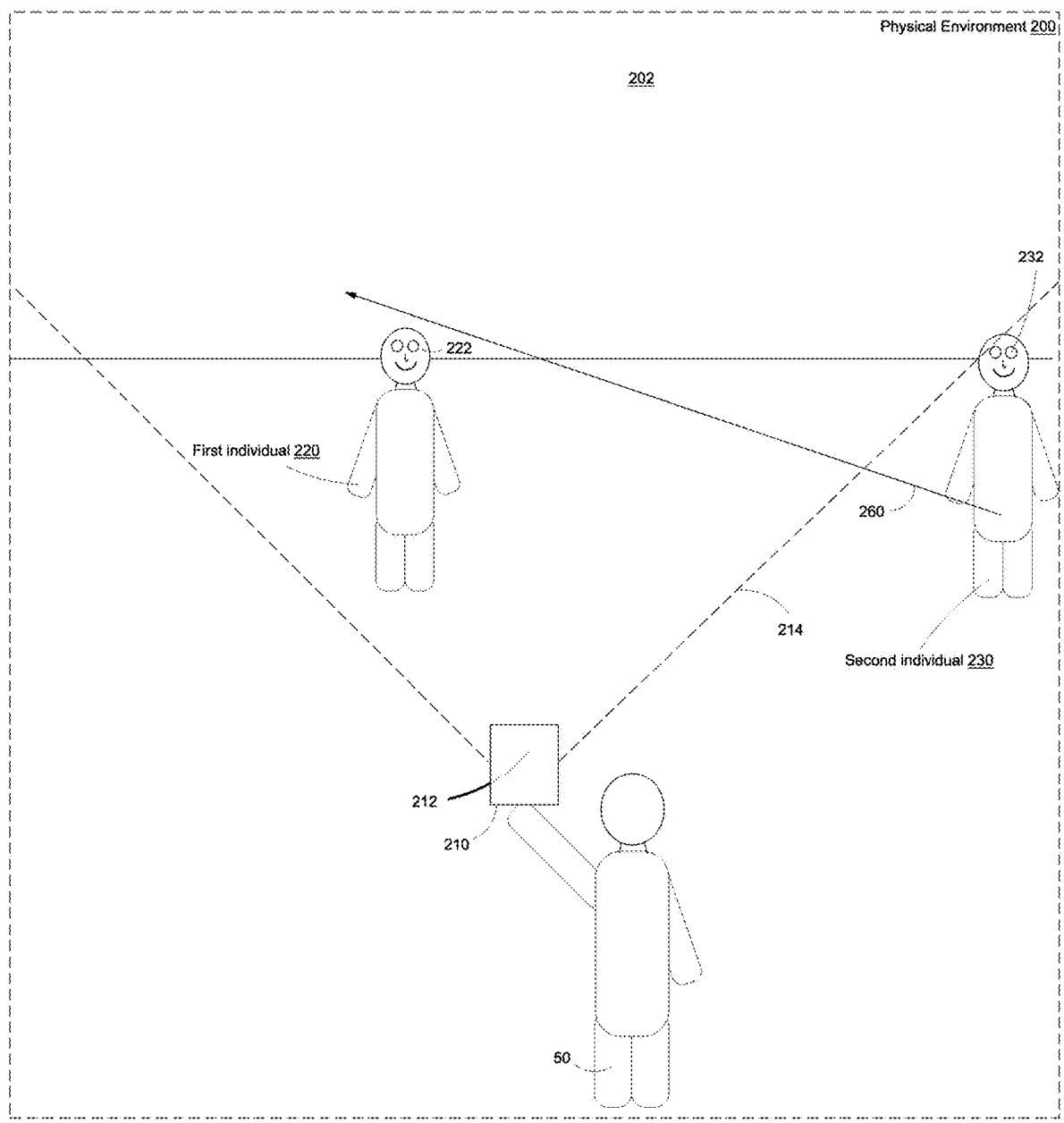
Figure 2O:
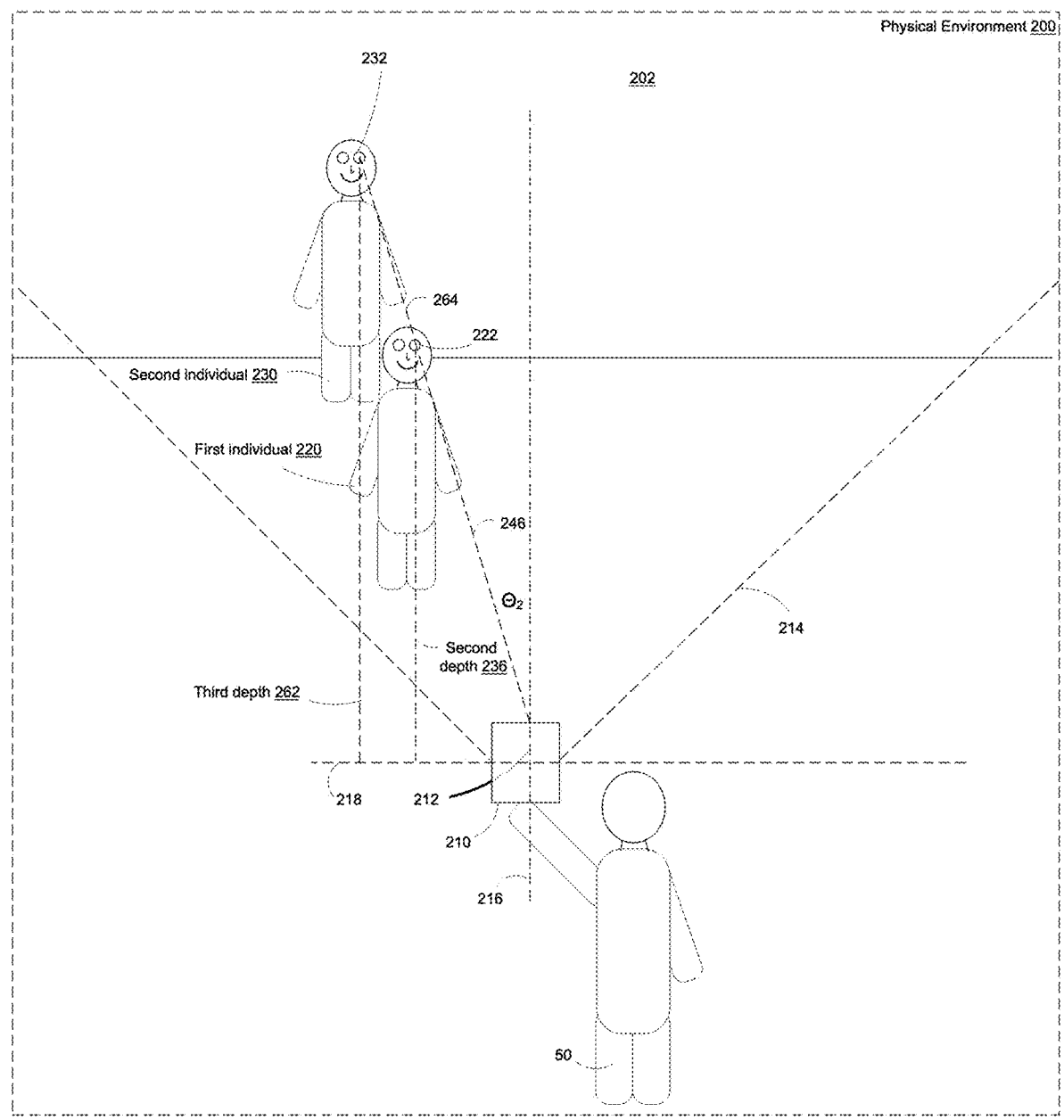
Figure 2P:
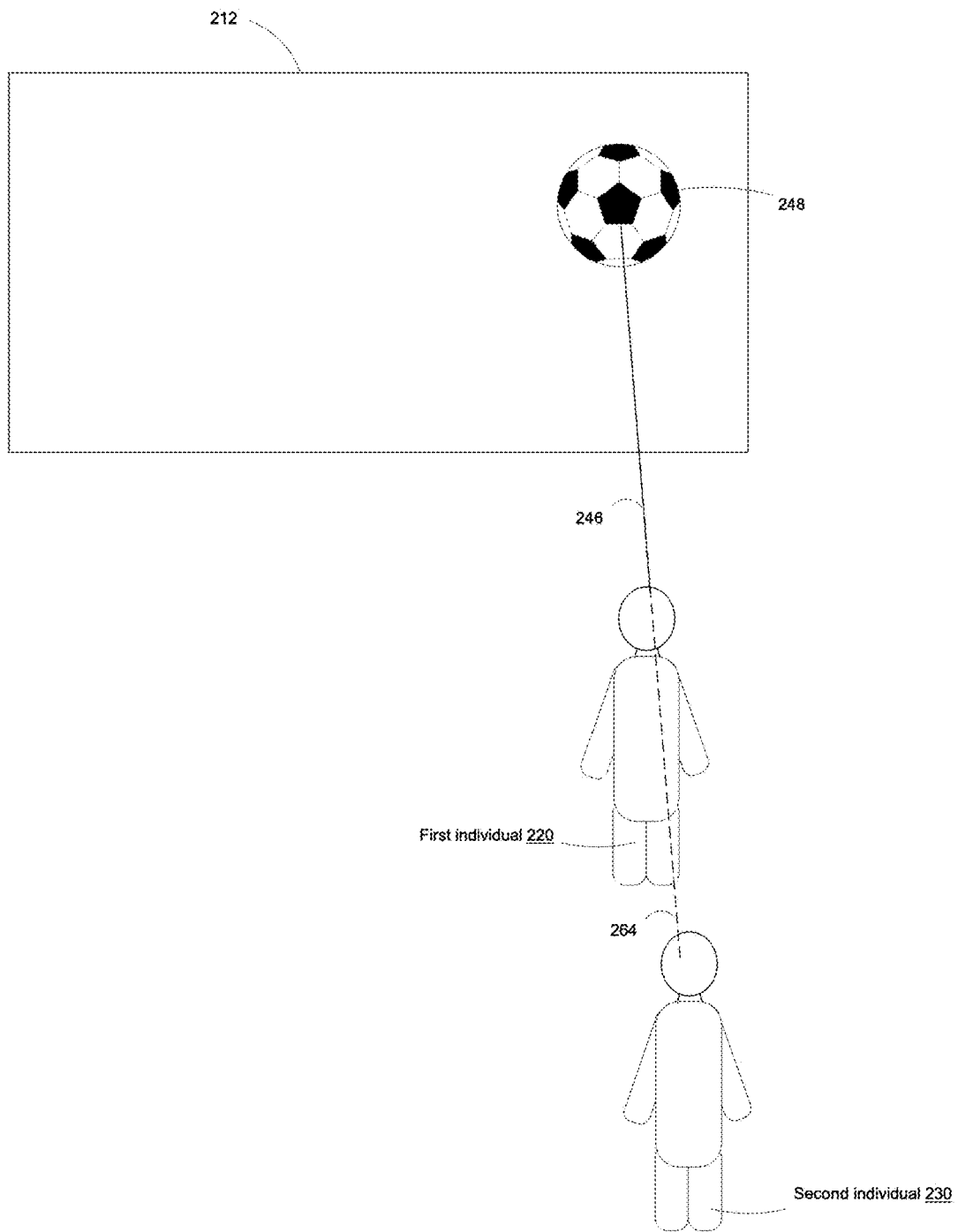

FIGS. 2A-2P are examples of displaying various display content data based on respective positions of individuals in accordance with some implementations. As illustrated in FIG. 2A, a physical environment 200 includes a wall 202, a first individual 220, a second individual 230, and a user 50 holding an electronic device 210. In some implementations, the electronic device 210 corresponds to a mobile device, such as a smartphone, smartwatch, tablet, laptop, and/or the like.

The electronic device 210 includes a display 212 that is associated with a viewable region 214 of the physical environment 200. The viewable region 214 includes a portion of the wall 202, the first individual 220, and the second individual 230. Accordingly, the first individual 220 and the second individual 230 may view content displayed on the display 212. In some implementations, the electronic device 210 includes multiple displays, such as the display 212 and another display. For example, the display 212 is externally facing (e.g., facing the first individual 220, and the second individual 230), whereas the other display is facing the user 50 and thus is viewable by the user 50.

In some implementations, the display 212 corresponds to a lenticular display, such as when a lenticular lens is arranged over (e.g., contacts the surface of) the display 212. A lenticular lens may include an array of magnifying elements. Each of the magnification elements may magnify distinct display content data, based on corresponding viewing angles of individuals with respect to the display 212. For example, a first magnification element magnifies first display content data displayed on the display 212, wherein the magnified first display content data is viewable by the first individual 220 but not viewable by the second individual 230. As another example, a second magnification element magnifies second display content data displayed on the display 212, wherein the magnified second display content data is viewable by the second individual 230 but not viewable by the first individual 220. A lenticular lens may be configured to enable stereoscopic viewing of the display 212 such that an individual perceives three-dimensional (3D) images. In some implementations, a plurality of lenticular lenses is placed over the display 212. For example, each of the plurality of lenticular lenses covers a respective portion of pixels of the display 212.

In some implementations, the electronic device 210 includes one or more environmental sensors. Each of the environmental sensor(s) outputs environmental data associated with the physical environmental 200. For example, the environmental sensor(s) include an image sensor that captures a portion of the physical environment 200, and outputs image data that represents the portion of the physical environment 200. As described below, the electronic device 210 may determine respective positions of the first individual 220 and the second individual 230 based on the environmental data.

The electronic device 210 obtains or determines various positional information with respect to the first individual 220 and the second individual 230. The positional information characterizes respective positions of the first individual 220 and of the second individual 230 with respect to the display 212. In some implementations, the electronic device 210 determines the positional information based on the environmental data. For example, the electronic device 210 performs a computer vision technique (e.g., semantic segmentation) with respect to image data, in order to determine a first position of the first individual 220 and determine a second position of the second individual 230.

As illustrated in FIG. 2B, the electronic device 210 determines a first eye position 222 corresponding to an eye of the first individual 220, and determines a second eye position 232 corresponding to an eye of the second individual 230. For example, the electronic device 210 performs semantic segmentation with respect to image data, in order to obtain a semantic label of "eye" for the first individual 220, and obtain a semantic label of "eye" for the second individual 230. One of ordinary skill in the art will appreciate that the electronic device 210 may track any portion of an individual in order to determine how to display corresponding display content data. Moreover, the first eye position 222 is associated with a first line of sight (LOS) 224 with respect to the display 212, and the second eye position 232 is associated with a second LOS 234 with respect to the display 212.

As further illustrated in FIG. 2B, the electronic device 210 determines a first viewing angle $\theta_1$ associated with the first individual 220 based on the first eye position 222, and determines a second viewing angle $\theta_2$ associated with the second individual 230 based on the second eye position 232. The first viewing angle $\theta_1$ corresponds to an angle between the first eye position 222 and a first reference line 216. The first reference line 216 is normal with respect to the display 212, running through the display 212 towards the wall 202. The second viewing angle $\theta_2$ corresponds to an angle between the second eye position 232 and the first reference line 216. For example, each of the first viewing angle $\theta_1$ and the second viewing angle $\theta_2$ indicates a respective horizontal offset from the center of the viewable region 214. Accordingly, an individual positioned at the center of the viewable region 214 (e.g., intersected by the first reference line 216) is associated with a viewing angle of approximately zero degrees. On the other hand, an individual positioned near an edge of the viewable region 214 is associated with a larger viewing angle (e.g., 40 degrees). In some implementations, the electronic device 210 determines the first viewing angle $\theta_1$ and the second viewing angle $\theta_2$ by performing a computer vision technique (e.g., semantic segmentation) with respect to image data from an image sensor that capture the physical environment 200. For example, a first individual represented near the center of an image is associated with a smaller viewing angle than a second individual represented farther from the center of the image.

In some implementations, as further illustrated in FIG. 2B, the electronic device 210 determines a first depth 226 associated with the first individual 220 with respect to the display 212, and determines a second depth 236 associated with the second individual 230 with respect to the display 212. The first depth 226 corresponds to a distance between the first eye position 222 and a second reference line 218. The second reference line 218 is parallel to the display 212 (e.g., runs along the surface of the display 212). The second depth 236 corresponds to a distance between the second eye position 232 and the second reference line 218. As illustrated in FIG. 2B, the first depth 226 is greater than the second depth 236 because the first individual 220 is farther from the display 212 (and closer to the wall 202) than the second individual 230 is to the display 212. In some implementations, the electronic device 210 includes a depth sensor that outputs depth data indicating the first depth 226 and the second depth 236. In some implementations, the electronic device 210 determines the first depth 226 and the second depth 236 based on a combination of the depth data, and performing computer vision with respect to image data from an image sensor.

According to various implementations, based on the various positional information (e.g., respective viewing angles and respective depths), the electronic device 210 generates and controls the display of different display content data on the display 212.

For example, in some implementations, the electronic device 210 generates, via a rendering system, different display content data based on rendering characteristics. A particular rendering characteristic may indicate a level of image quality of the output of the rendering system. As one example, the rendering system generates higher resolution display content data for an individual associated with a lesser depth or a smaller viewing angle. As another example, the rendering system generates display content data at a lower rendering frequency (e.g., graphic processing unit (GPU) generates fewer image frames per second) for an individual associated with a greater depth or a larger viewing angle. Further details with respect to determining and utilizing rendering characteristics are described with reference to FIG. 3.

As another example, in some implementations, the electronic device 210 controls the display of display content data based on display operation parameters. A particular display operation parameter may indicate a display quality or performance associated with display of display content data on a display. For example, in some implementations, the electronic device 210 includes a display controller that sets pixel illumination (e.g., brightness) levels associated with pixels of a display, or sets a display frame rate associated with the display. As one example, the display controller sets a subset of the pixels of the display 212 to a particular illumination level, wherein the subset of the pixels is associated with (e.g., viewable by) a particular individual. Continuing with this example, the particular illumination level may be inversely proportional to the depth or the viewing angle associated with the particular individual. As another example, display content data is associated with (e.g., viewable by) a particular individual, and the display content data includes a plurality of images. Continuing with this example, the display controller directs the display 212 to display the plurality of images at a particular display rate (e.g., frames per second (FPS)), which may be inversely proportional to the depth or the viewing angle associated with the particular individual. Further details with respect to determining and utilizing display operation parameters are described with reference to FIG. 4.

As illustrated in FIG. 2C, the electronic device 210 displays, on the display 212, first display content data 242 corresponding to a soccer ball, and second display content data 240 corresponding to a basketball. The first display content data 242 is associated with the first viewing angle $\theta_1$, and the second display content data 240 is associated with the second viewing angle $\theta_2$. Accordingly, the first display content data 242 is viewable by the first individual 220 via the first LOS 224, and the second display content data 240 is viewable by the second individual 230 via the second LOS 234. In some implementations, such as when the display 212 includes a lenticular lens, the first display content data 242 is viewable by the first individual 220 but not viewable by the second individual 230, whereas the second content data 240 is viewable by the second individual 230 but not viewable by the first individual 220. Notably, as illustrated in FIG. 2C, the display 212 includes the soccer ball having a lower quality (e.g., lower resolution) than the displayed basketball. Namely, the first display content data 242 includes pixels corresponding to outlines of the pentagons of the soccer ball, but does not include pixels within the pentagons. On the other hand, the second display content data 240 includes pixels corresponding to the entirety of the basketball, including outline and interior portions. By displaying a lower resolution soccer ball, the electronic device 210 reduces the utilization of processing (e.g., rendering) and/or display resources.

In some implementations, the electronic device 210 generates, via a rendering system, the first display content data 242 and second display content data 240 based on first and second rendering characteristics, respectively. For example, the electronic device 210 determines the first rendering characteristic based on the first viewing angle $\theta_1$ and the first depth 226, and determines the second rendering characteristic based on the second viewing angle $\theta_2$ and the second depth 236. Because the first depth 226 is greater than the second depth 236, and because the first viewing angle $\theta_1$ is similar to the second viewing angle $\theta_2$, the electronic device 210 determines the first rendering characteristic indicates a lower image quality than is indicated by the second rendering characteristic. For example, the second individual 230 is closer to the display 212 than is the first individual 220, and thus a relatively high image quality is more valuable with respect to the second display content data 240 (associated with the second individual 230) than for the first display content data 242 (associated with the first individual 220). A lower resolution soccer ball is associated with the electronic device 210 utilizing less processing resources (e.g., GPU resources) and/or display resources.

In some implementations, in addition to or instead of changing image quality via the rendering system, the electronic device 210 controls display quality via a display controller and display operation parameters. For example, based on the respective depths and viewing angles of the first individual 220 and the second individual 230, the electronic device 210 determines a first display operation parameter (associated with the first individual 220), and determines a second display operation parameter (associated with the second individual 230). For example, because the first depth 226 is greater than the second depth 236, the electronic device 210 determines that the first display operation parameter indicates a lower display quality than is indicated by the second display operation parameter. Accordingly, based on the first and second display operation parameters, the display controller sets a higher illumination level (e.g., brightness level) for pixels of the basketball than for pixels of the soccer ball. Brighter content may be better appreciated by an individual closer to (lower depth with respect to) the display 212.

As illustrated in FIG. 2D, the first individual 220 moves closer to the display 212, as indicated by a first movement line 244. Accordingly, as illustrated in FIG. 2E, after completing the movement the first individual 220 is at the second viewing angle $\theta_2$ with respect to the display 212, and at the second depth 236 with respect to the display 212. Based on the movement, the first eye position 222 of the first individual 220 is associated with a third LOS 246 with respect to the display 212. Because the first individual 220 has moved closer to the display 212, the first individual 220 is better suited to appreciate higher quality display content data. Accordingly, the electronic device 210 replaces display of the first display content data 242 with a higher resolution third display content data 248, as illustrated in FIG. 2F. Namely, in addition to including the pixels corresponding to the outlines of the pentagons of the soccer ball, the third display content data 248 includes pixels corresponding to the inner portions the pentagons (the black shading).

As illustrated in FIG. 2G, the second individual 230 begins a rightwards movement to a portion of the physical environment 200 that is outside of the viewable region 214, as indicated by a second movement line 250. Accordingly, as illustrated in FIG. 2H, during the movement the electronic device 210 tracks the second eye position 232 of the second individual 230, and accordingly determines a third viewing angle $\theta_3$ that is larger than the second viewing angle $\theta_2$. The third viewing angle $\theta_3$ is associated with a fourth LOS 252 with respect to the display 212. Because the third viewing angle $\theta_3$ is larger than the second viewing angle $\theta_2$, the electronic device 210 reduces the resolution of the basketball. Namely, as illustrated in FIG. 2I, the electronic device 210 displays, on the display 212, fourth display content data 254 corresponding to the outline pixels of the basketball, but not including the inner pixels of the basketball. Thus, as compared with the second display content data 240, the fourth display content data 254 corresponds to a lower resolution version of the basketball. A lower resolution basketball is associated with the electronic device 210 reducing the utilization of processing (e.g., generating the basketball) and/or display resources.

As illustrated in FIG. 2J, the second individual 230 has moved further rightwards within the physical environment 200. Accordingly, the electronic device 210 determines a fourth viewing angle $\theta_4$ that is larger than the third viewing angle $\theta_3$. The fourth viewing angle $\theta_4$ is associated with a fifth LOS 256 with respect to the display 212. Because the fourth viewing angle $\theta_4$ is larger than the third viewing angle $\theta_3$, the electronic device 210 further reduces the resolution of the basketball. Namely, as illustrated in FIG. 2K, the electronic device 210 displays, on the display 212, fifth display content data 258 corresponding to a subset of the outline pixels of the basketball. The subset of the outline pixels of the basketball is indicated by dotted-line outlines of the basketball, in contrast to the solid line outlines of the fourth display content data 254. Thus, the fifth display content data 258 corresponds to a lower resolution version of the basketball, as compared with the fourth display content data 254. A lower resolution basketball is associated with the electronic device 210 reducing the utilization of processing (e.g., generating the basketball) and/or display resources.

As illustrated in FIG. 2L, the second individual 230 completes the rightwards movement and is located outside of the viewable region 214. In some implementations, the electronic device 210 may determine that the second eye position 232 of the second individual 230 ceases to be within the viewable region 214. For example, the electronic device 210 performs semantic segmentation with respect to image data associated with approximately the viewable region 214, and determines that the image data no longer includes a representation of the second eye position 232 of the second individual 230. Thus, the electronic device 210 may cease to generate display content data corresponding to the basketball (e.g., the second, fourth, and fifth display content data 240, 254, and 258, respectively), as illustrated in FIG. 2M. Accordingly, the electronic device 210 further reduces resource utilization by not generating and/or driving display of display content data corresponding to the basketball.

As illustrated in FIG. 2N, the second individual 230 moves to a different position within the viewable region 214, as indicated by a third movement line 260. Accordingly, based on the movement, the electronic device 210 determines that the second individual 230 is positioned at a third depth 262 that is greater than the second depth 236, as illustrated in FIG. 2O. Moreover, the electronic device 210 determines that the second individual 230 is associated with the second viewing angle $\theta_2$, which is also associated with the first individual 220. In other words, the second individual 230 is directly behind the first individual 220 within the physical environment 200. Additionally, based on the movement, the second eye position 232 of the second individual 230 is associated with a sixth LOS 264 with respect to the display 212. Based on determining that the first individual 220 and the second individual 230 are associated with the same second viewing angle $\theta_2$, the electronic device 210 maintains display of the third display content data 248 (the soccer ball), as illustrated in FIG. 2P. The third display content data 248 is viewable by the first individual 220 via the third LOS 246, and is viewable by the second individual 230 via the sixth LOS 264. By foregoing generation and display of a basketball in this situation, the electronic device 210 saves processing and display resources.

Figure 3:
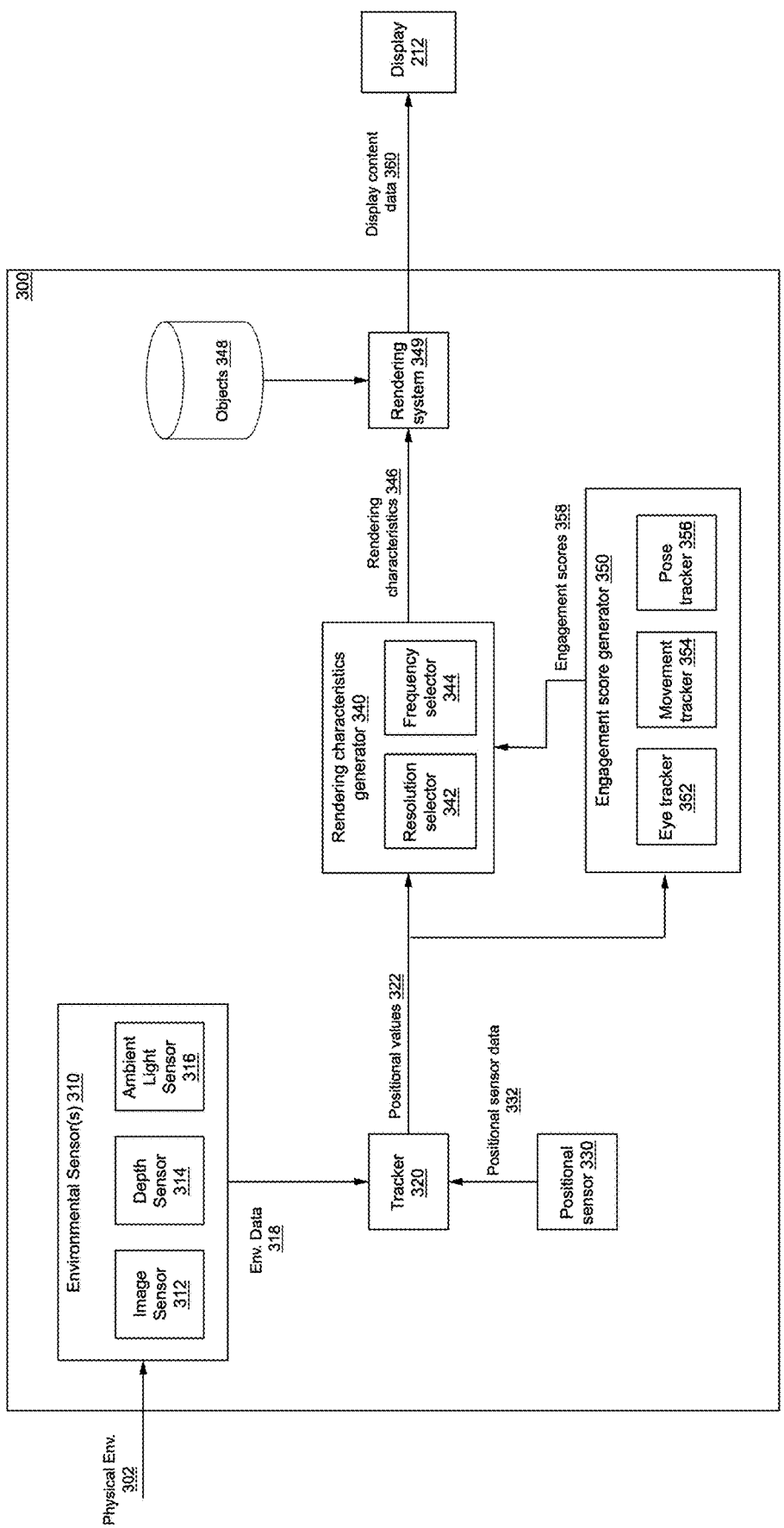
FIG. 3 is an example of a first system that generates display content data based on rendering characteristics in accordance with some implementations.

FIG. 3 is an example of a first system 300 that generates display content data based on rendering characteristics in accordance with some implementations. According to various implementations, the first system 300 or portions thereof is integrated in an electronic device, such as the electronic device 210 described with reference to FIG. 2A-2P.

In some implementations, the first system 300 includes one or more environmental sensors 310 that sense various features of a physical environment 302 (e.g., the physical environment 200 of FIGS. 2A-2P). Each of the environmental sensor(s) 310 outputs a corresponding portion of environmental data 318. For example, the environmental data 318 includes a combination of image data from an image sensor 312, depth data from a depth sensor 314, and ambient light data from an ambient light sensor 316.

According to various implementations, the first system 300 includes a tracker 320. The tracker 320 determines a plurality of positional values 322 (sometimes referred to herein as "positional information") respectively characterizing a plurality of individuals positioned within the physical environment 302, based on the environmental data 318. For example, the plurality of positional values 322 include a combination of viewing angles and/or depths, such as is described with reference to FIGS. 2A-2P. The first system 300 may perform a computer vision technique, optionally with the aid of a neural network, in order to determine the plurality of positional values 322. In some implementations, the tracker 320 utilizes positional sensor data 332 from a positional sensor 330 in order to determine the plurality of positional values 322. The positional sensor data 332 may indicate a positional change of the first system 300. For example, the positional sensor 330 includes an IMU that outputs various positional data and orientation data characterizing movement of the first system 300.

In some implementations, the first system 300 includes an engagement score generator 350. The engagement score generator 350 determines a plurality of engagement scores 358 respectively associated with a plurality of individuals, based on the plurality of positional values 322. A particular one of the plurality of engagement scores 358 characterizes a level of engagement between a corresponding individual and the display 212. For example, in some implementations, the engagement score 350 includes an eye tracker 352 that determines a characteristic of an eye of the corresponding individual. The characteristic of the eye may indicate whether the eye is open or closed (e.g., higher engagement score for an open eye), gaze of the eye (e.g., higher engagement score when gaze of the eye is towards the display 212), and/or the like. As another example, in some implementations, the engagement score 350 includes a movement tracker 354 that determines movement characteristics associated with individuals. A particular movement characteristic may indicate a direction of movement (e.g., higher engagement score for a movement towards the display 212), a gesture type (e.g., higher engagement score for waving at the display 212), and/or the like. As yet another example, in some implementations, the engagement score 350 includes a pose tracker 356 that determines pose characteristics associated with individuals. A particular pose characteristic may indicate whether a head or body of an individual is facing towards the display 212 (higher engagement score) or away from the display 212 (lower engagement score).

The first system 300 includes a rendering characteristics generator 340 that determines a plurality of rendering characteristics 346 respectively based on the plurality of positional values 322. In some implementations, the plurality of rendering characteristics 346 indicates a plurality of resolution values respectively associated with the plurality of viewing angles. To that end, in some implementations, the rendering characteristics generator 340 includes a resolution selector 342 that determines the plurality of resolution values. For example, when a particular one of the positional values 322 indicates a relatively high depth or a relatively high viewing angle, the resolution selector 342 determines a relatively low resolution value. As one example, with reference to FIGS. 2A-2C, the resolution selector 342 determines a first resolution value associated with the first individual 220 based on a combination of the first viewing angle $\theta_1$ and the first depth 226, and determines a second resolution value associated with the second individual 230 based on a combination of the second viewing angle $\theta_2$ and the second depth 236. The first resolution value is lower than the second resolution value because the first depth 226 is greater than the second depth 236. Accordingly, referring back to FIG. 3, a rendering system 349 (e.g., a GPU) generates a first portion of display content data 360 (associated with the first viewing angle $\theta_1$) that has a lower resolution than a second portion of the display content data 360 (associated with the second viewing angle $\theta_2$). For example, the rendering system 349 renders a first object and a second object (e.g., retrieved from an objects datastore 348) in order to respectively generate the first and second portions of the display content data 360. In some implementations, the first system 300 transmits, to the display 212, the first and second portions of the display content data 360, such as is illustrated in FIG. 2C.

In some implementations, the plurality of rendering characteristics 346 indicates a plurality of rendering frequencies respectively associated with the plurality of individuals. To that end, the first system 300 may include a frequency selector 344 that determines the plurality of rendering frequencies. The rendering system 349 may generate a corresponding portion of the display content data 360 at a corresponding one of the plurality of rendering frequencies. For example, with reference to FIGS. 2J and 2K, the frequency selector 344 determines a first rendering frequency associated with the first individual 220, and determines a second rendering frequency associated with the second individual 230. Because the second viewing angle $\theta_2$ associated with the first individual 220 is smaller than the fourth viewing angle $\theta_4$ associated with the second individual 230, the first rendering frequency is higher than the second rendering frequency. Accordingly, referring back to FIG. 3, the rendering system 349 generates a first portion of the display content data 360 (associated with the second viewing angle $\theta_2$) at a higher rate (e.g., generates more image frames per second) than a rate associated with generating a second portion of the display content data 360 (associated with the fourth viewing angle $\theta_4$).

In some implementations, the rendering characteristics generator 340 determines the plurality of rendering characteristics 346 further based on the plurality of engagement scores 358. For example, with reference to FIGS. 2G-2M, the engagement score generator 350 determines a decreasing engagement score associated with the second individual 230, based on a determined movement characteristic. Namely, as the second individual 230 moves rightwards, the engagement score generator 350 identifies an increasing viewing angle between the second individual 230 and the display 212, and correspondingly reduces the engagement score. Based on the decreasing engagement score, the rendering characteristics generator 340 reduces a rendering characteristic associated with the second individual 230. Thus, as the second individual 230 moves across the physical environment 200, the rendering system 349 generates corresponding (viewable by the second individual 230) having a decreasing resolution and/or at a decreasing rendering frequency, based on the decreasing rendering characteristic.

Figure 4:
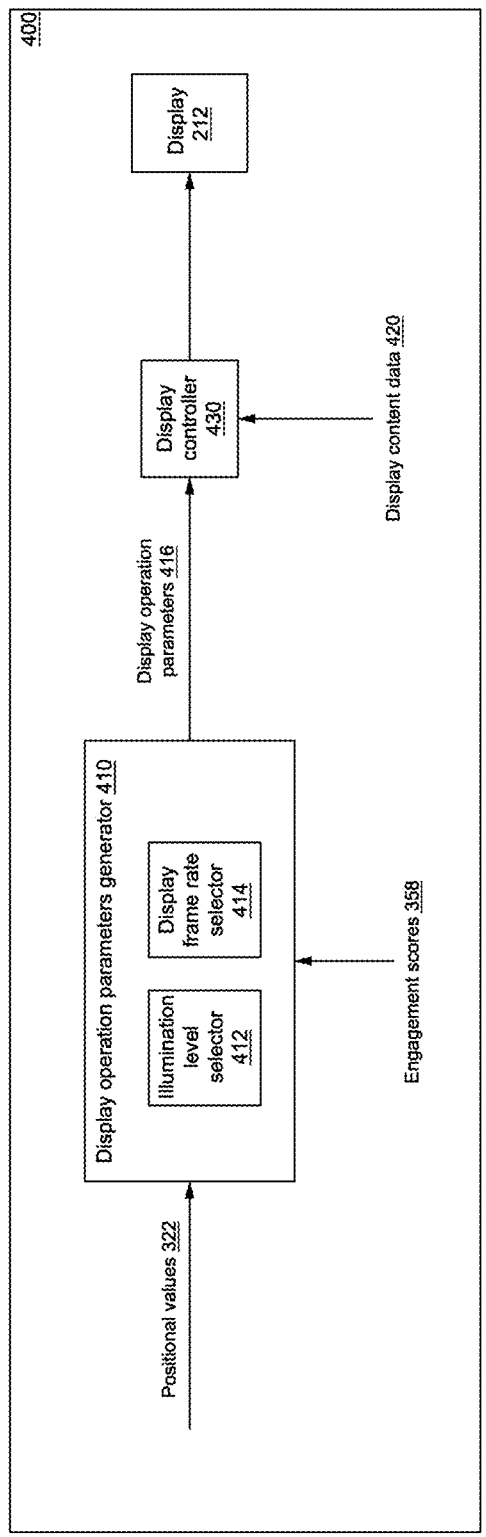
FIG. 4 is an example of a second system that controls a display based on display operation parameters in accordance with some implementations.

FIG. 4 is an example of a second system 400 that controls the display 212 based on display operation parameters in accordance with some implementations. According to various implementations, the second system 400 or portions thereof is integrated in an electronic device, such as the electronic device 210 described with reference to FIG. 2A-2P. In some implementations, the second system 400 includes various components of the first system 300.

The second system 400 includes a display operation parameters generator 410 that determines a plurality of display operation parameters 416 based at least in part on the plurality of positional values 322. Each of the plurality of display operation parameters 416 is associated with a corresponding individual. Moreover, each of the plurality of display operation parameters 416 may indicate a display quality associated with a corresponding portion of display content data 420 displayed on the display 212. In some implementations, a particular one of the plurality of display operation parameters 416 has an inverse relationship with respect to a corresponding one of the plurality of the positional values 322.

Based on the plurality of display operation parameters 416, a display controller 430 controls (e.g., drives) display of corresponding portions of the display content data 420 on the display 212. In some implementations, the display content data 420 is received from a rendering system that generates the display content data 420 based on a plurality of rendering characteristics, such as the rendering system 349 described with reference to FIG. 3. In some implementations, the display content data 420 is generated independently of rendering characteristics.

In some implementations, a particular one of the plurality of display operation parameters 416 indicates a pixel illumination level associated with a corresponding portion of the display content data 420. To that end, in some implementations, the display operation parameters generator 410 includes an illumination level selector 412 that determines various pixel illumination levels based on the plurality of the positional values 322. For example, with reference to FIG. 2B, the illumination level selector 412 determines a first pixel illumination level associated with a first portion of the display content data 420 (viewable by the first individual 220), and determines a second pixel illumination level associated with a second portion of the display content data 420 (viewable by the second individual 230). Continuing with this example, the first pixel illumination level is less than the second pixel illumination level because the first depth 226 is greater than the second depth 236. Accordingly, the display controller 430 drives pixels of the display 212 to display the first portion of the display content data 420 dimmer (e.g., less bright) than display of the second portion of the display content data 420. The second individual 230 can better appreciate a brighter display because the second individual 230 is closer to the display 212. The second system 400, therefore, reduces display resources (e.g., power consumption) by displaying the first portion of the display content data 420 at a relatively low brightness level. In some implementations, the illumination level selector 412 sets certain pixels of the display 212 to a nominal illumination level, further saving display resources. For example, in FIG. 2K the display controller 430 turns off certain pixels of the display 212 such that the outlines of the basketball are dotted lines, rather than the solid lines (having additional pixels) of the outlines of the basketball illustrated in FIG. 2I.

In some implementations, a particular one of the plurality of display operation parameters 416 indicates a display frame rate (e.g., frames per second (FPS)) associated with a corresponding portion of the display content data 420. To that end, in some implementations, the display operation parameters generator 410 includes a display frame rate selector 414 that determines various display frame rates based on the plurality of the positional values 322. For example, with reference to FIG. 2J, the display frame rate selector 414 determines a first display frame rate associated with a first portion of the display content data 420 (viewable by the first individual 220), and determines a second display frame rate associated with a second portion of the display content data 420 (viewable by the second individual 230). Continuing with this example, the first display frame rate is higher than the second display frame rate because the second viewing angle $\theta_2$ (between the first individual 220 and the display 212) is less than the fourth viewing angle $\theta_4$ (between the second individual 230 and the display 212). Accordingly, the display controller 430 drives the display 212 to display the first portion of the display content data 420 at higher display frame rate (e.g., higher FPS) than display of the second portion of the display content data 420. The first individual 220 can better appreciate a higher display frame rate because the first individual 220 is closer to the center of the viewable region 214. The second system 400, therefore, reduces display resources (e.g., power consumption) by displaying the second portion of the display content data 420 at a relatively low display frame rate.

In some implementations, the display operation parameters generator 410 determines the plurality of display operation parameters 416 further based on the plurality of engagement scores 358. To that end, in some implementations, the second system 400 includes the engagement score generator 350 described with reference to FIG. 3. For example, a first engagement score is based on a first individual walking towards the display 212, whereas a second engagement score is based on a second individual walking away from the display 212. The second individual is walking away from the display 212 and thus is less engaged with respect to the display 212. Accordingly, the second engagement score is lower than the first engagement score. The display operation parameters generator 410 may determine a first display operation parameter that is proportional to the first engagement score, and may determine a second display operation parameter that is proportional to the second engagement score. Accordingly, the first display operation parameter indicates a higher display quality than the second display operation parameter indicates. Based on the first and second display operation parameters, the display controller 430 drives the display 212 such that pixel brightness and/or display frame rate associated with a first portion of the display content data 420 (viewable by the first individual) is greater than pixel brightness and/or display frame rate associated with a second portion of the display content data 420 (viewable by the second individual).

Figure 5:
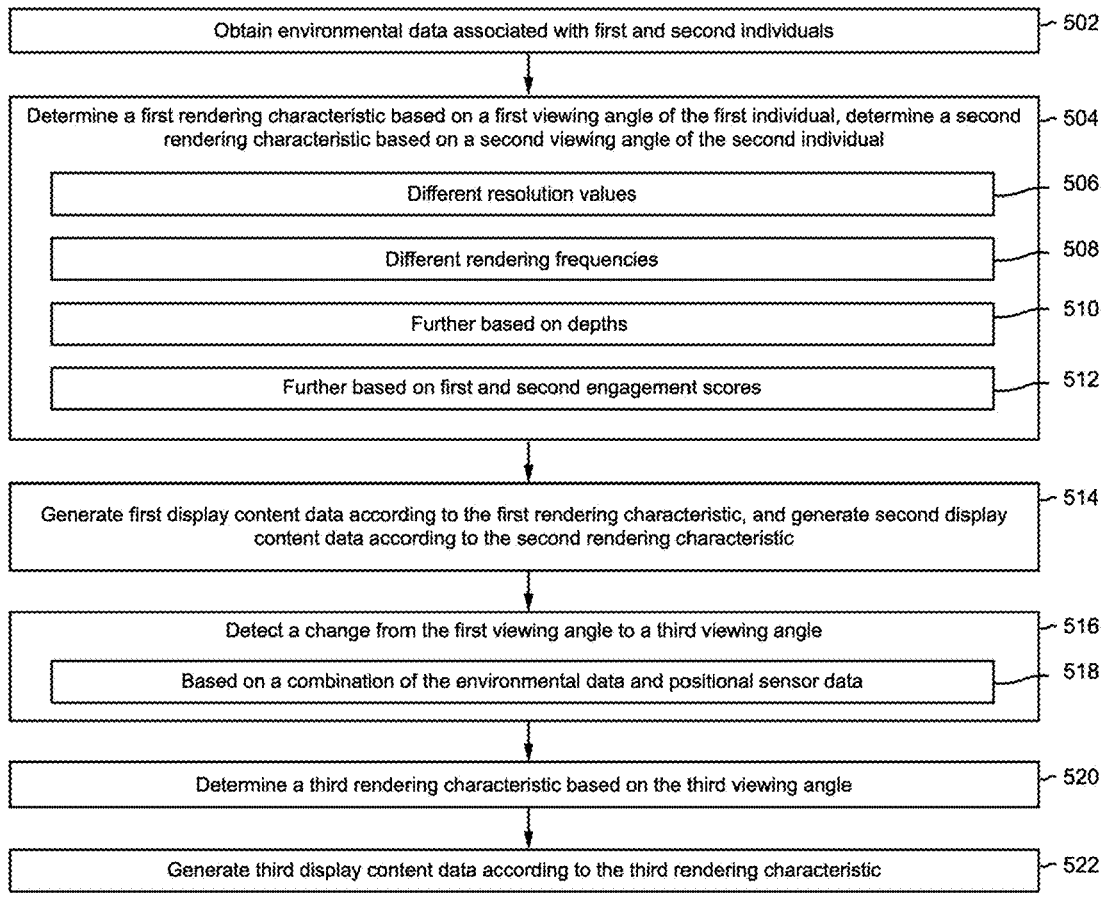
FIG. 5 is an example of a flow diagram of a method of generating display content data based on respective positions of individuals with respect to a display in accordance with some implementations.

FIG. 5 is an example of a flow diagram of a method 500 of generating display content data based on respective positions of individuals with respect to a display in accordance with some implementations. In various implementations, the method 500 or portions thereof are performed by an electronic device including a display (e.g., the electronic device 210). In various implementations, the method 500 or portions thereof are performed by the first system 300. In various implementations, the method 500 or portions thereof are performed by a mobile device, such as a smartphone, tablet, or wearable device. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, in some implementations, the method 500 includes obtaining environmental data from an environmental sensor. For example, with reference to FIG. 3, the environmental data 318 includes a combination of image data from the image sensor 312, depth data from the depth sensor 314, and ambient light data from the ambient light sensor 316.

As represented by block 504, the method 500 includes determining a first rendering characteristic based on a first viewing angle of a first individual with respect to the display, and determining a second rendering characteristic based on a second viewing angle of a second individual with respect to the display. To that end, in some implementations, the method 500 includes determining the first viewing angle based on a first portion of the environmental data associated with the first individual, and determining the second viewing angle based on a second portion of the environmental data associated with the second individual. For example, with reference to FIG. 2B, the electronic device 210 includes an image sensor that captures the first individual 220 and the second individual 230, and outputs corresponding image data. Continuing with this example, the electronic device 210 performs a computer vision technique with respect to the corresponding image data in order to determine the first and second viewing angles ($\theta_1$ and $\theta_2$).

A particular rendering characteristic may indicate an image quality (e.g., a resolution value) and/or rendering frequency associated with a rendering system generating corresponding display content data. In some implementations, the first rendering characteristic has an inverse relationship with respect to the first viewing angle, and the second rendering characteristic has an inverse relationship with respect to the second viewing angle. For example, with reference to FIG. 2H, the electronic device 210 determines a first rendering characteristic (associated with the first individual 220) that is greater than a determined second rendering characteristic (associated with the second individual 230), because the first individual 220 is associated with a second viewing angle $\theta_2$ that is less than the third viewing angle $\theta_3$ associated with the second individual 230.

As represented by block 506, in some implementations, the first rendering characteristic indicates a first resolution value, and the second rendering characteristic indicates a second resolution value that is different from the first resolution value. As described with reference to block 514, the method 500 may include generating first and second display content data respectively associated with the first and second resolution values. For example, the first display content data includes a first plurality of images characterized by the first resolution value, and the second display content data includes a second plurality of images characterized by the second resolution value.

As represented by block 508, in some implementations, the first rendering characteristic indicates a first rendering frequency, and the second rendering characteristic indicates a second rendering frequency that is different from the first rendering frequency. For example, with reference to FIG. 3, the rendering system 349 generates M image frames per second based on a first rendering frequency in order to generate a first portion of the display content data 360 (viewable by a first individual). Continuing with this example, the rendering system 349 generates N image frames per second based on a second rendering frequency, in order to generate a second portion of the display content data 360 (viewable by a second individual), wherein M is different from N.

As represented by block 510, in some implementations, the method 500 includes determining the first rendering characteristic further based on a first depth, and determining the second rendering characteristic further based on a second depth. The first depth corresponds to a distance between the first individual and the display, and the second depth corresponds to a distance between the second individual and the display. To that end, in some implementations, the method 500 includes determining the first depth based on a first portion of the environmental data associated with the first individual, and determining the second depth based on a second portion of the environmental data associated with the second individual. For example, with reference to FIG. 2B, the electronic device 210 includes a depth sensor that outputs the first depth 226 associated with the first individual 220, and outputs the second depth 236 associated with the second individual 230. In some implementations, the first rendering characteristic has an inverse relationship with respect to the first depth, and the second rendering characteristic has an inverse relationship with respect to the second depth. Continuing with the previous example, the electronic device 210 determines a first rendering characteristic (associated with the first individual 220) that is lower than a second rendering characteristic (associated with the second individual 230), because the first depth 226 is greater than the second depth 236.

As represented by block 512, in some implementations, the method 500 includes determining the first rendering characteristic further based on a first engagement score, and determining the second rendering characteristic further based on a second engagement score. For example, the first engagement level is based on a movement characteristic associated with the first individual, and the second engagement level is based on a movement characteristic associated with the second individual. As another example, the first engagement level is based on a pose characteristic associated with the first individual, and the second engagement level is based on a pose characteristic associated with the second individual. As yet another example, the first engagement level is based on a characteristic of an eye of the first individual, and wherein the second engagement level is based on a characteristic of an eye of the second individual. Various examples of utilizing engagement scores are described with reference to the engagement score generator 350 illustrated in FIG. 3.

As represented by block 514, the method 500 includes generating, via a rendering system, first display content data according to the first rendering characteristic, and generating, via the rendering system, second display content data according to the second rendering characteristic. The first display content data is associated with the first viewing angle. The second display content data is associated with the second viewing angle. In some implementations, the rendering system includes a GPU, which generates the first and second display content data based on corresponding objects. As one example, with reference to FIGS. 2B and 2C, a rendering system of the electronic device 210 generates the first display content data 242 based on a first rendering characteristic, and generates the second display content data 240 based on a second rendering characteristic that is greater than the first rendering characteristic (e.g., basketball has a higher resolution than soccer ball). As another example, with reference to FIG. 3, the rendering system 349 generates a first portion of the display content data 360 based on a first one of the plurality of rendering characteristics 346, and generates a second portion of the display content data 360 based on a second one of the plurality of rendering characteristics 346. In some implementations, generating the first display content data according to the first rendering characteristic is associated with a first rendering resource utilization value. Moreover, generating the second display content data according to the second rendering characteristic is associated with a second rendering resource utilization value different from the first rendering resource utilization value. For example, with reference to FIGS. 2C and 3, the rendering system 349 generates the first display content data 242 according to a first resolution value, and generates the second display content data 240 according to a second resolution value. Generation of the first display content data 242 is associated with a lower resource utilization value because, as illustrated in FIG. 2C, the first display content data 242 (the soccer ball) corresponds to lower resolution image data than the second display content data 240 (the basketball).

As represented by block 516, in some implementations, the method 500 includes detecting a change from the first viewing angle to a third viewing angle. As represented by block 518, detecting the change may be based on a combination of the environmental data and positional sensor data. For example, with reference to FIGS. 2H-2J, the electronic device 210 detects a change from the third viewing angle $\theta_3$ to the fourth viewing angle $\theta_4$, based on environmental data—e.g., the electronic device 210 performs a computer vision technique with respect to the environmental data in order to track the rightwards movement of the second individual 230. As another example, based on positional sensor data from a positional sensor (e.g., the positional sensor 330 in FIG. 3), an electronic device determines the change in viewing angle.

As represented by block 520, in some implementations, in response to detecting the change, the method 500 includes determining a third rendering characteristic based on the third viewing angle. For example, with reference to FIGS. 2H-2J, based on detecting the change from the third viewing angle $\theta_3$ to the fourth viewing angle $\theta_4$, the electronic device 210 reduces the rendering characteristic because the updated position of the second individual 230 is nearer to the edge of the viewable region 214. Accordingly, as represented by block 522, the method 500 may include ceasing to generate the first display content data according to the first rendering characteristic, and may include generating third display content data according to the third rendering characteristic. Continuing with the previous example, based on reducing the rendering characteristic, the electronic device 210 generates the fifth display content data 258 (illustrated in FIG. 2K), which corresponds to a lower resolution version of the basketball, as compared with the fourth display content data 254 (illustrated in FIG. 2I).

In some implementations, the method 500 includes determining that the first individual ceases to be within a viewable region associated with the display. Moreover, in response to determining that the first individual ceases to be within the viewable region, the method 500 includes ceasing to generate the first display content data, and continuing to generate the second display content data according to the second rendering characteristic. With reference to FIG. 2L, the electronic device 210 determines that the second individual 230 is no longer within the viewable region 214. Accordingly, the electronic device 210 ceases to generate the fifth display content data 258 (the basketball), and thus the display 212 illustrated in FIG. 2M does not include a basketball.

Figure 6:
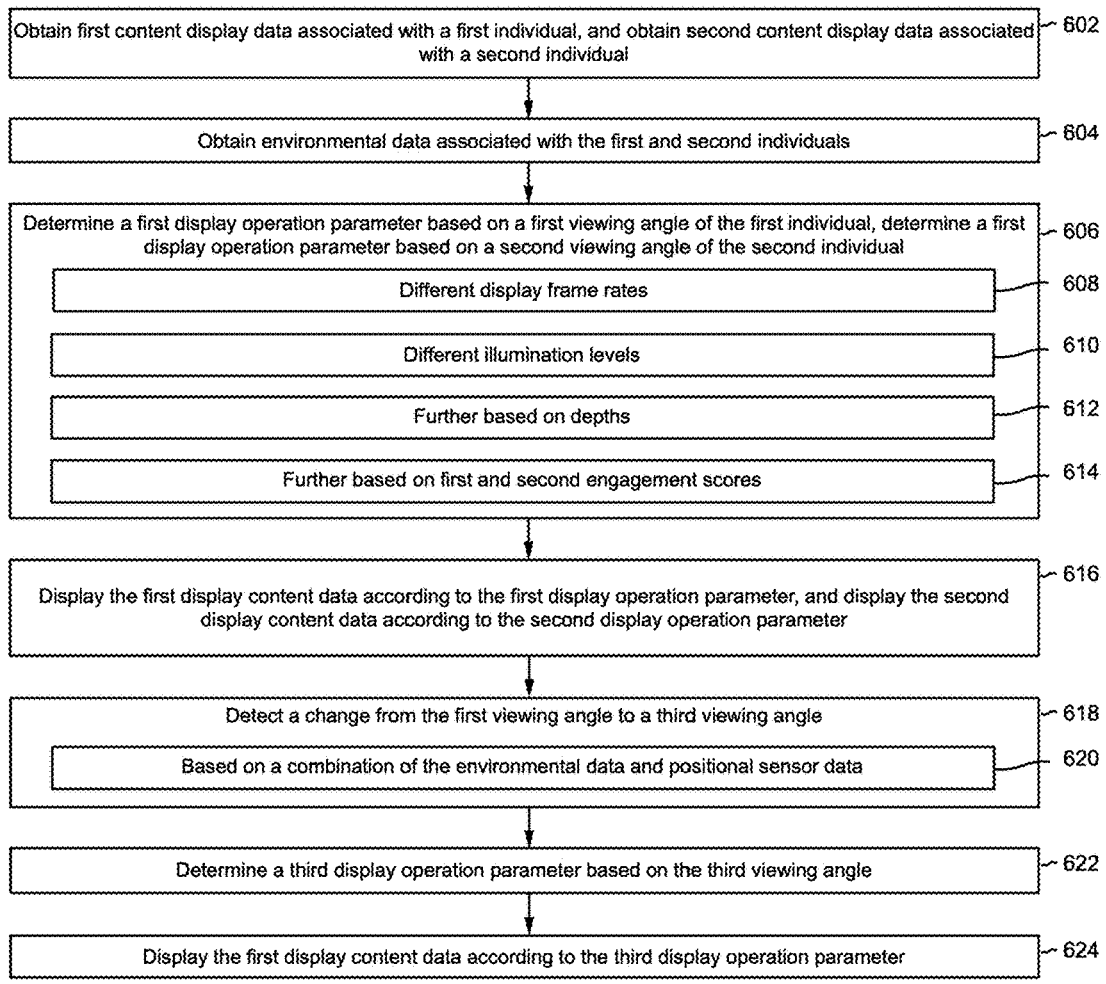
FIG. 6 is an example of a flow diagram of a method of controlling a display based on respective positions of individuals with respect to the display in accordance with some implementations.

FIG. 6 is an example of a flow diagram of a method 600 of controlling a display based on respective positions of individuals with respect to the display in accordance with some implementations. In various implementations, the method 600 or portions thereof are performed by an electronic device including a display (e.g., the electronic device 210). In various implementations, the method 600 or portions thereof are performed by the second system 400. In various implementations, the method 600 or portions thereof are performed by a mobile device, such as a smartphone, tablet, or wearable device. In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 602, the method 600 includes obtaining first display content data associated with a first individual, and obtaining second display content data associated with a second individual. For example, with reference to FIG. 4, the display controller obtains first and second portions of the display content data 420, wherein the first portion is associated with a first individual, and wherein the second portion is associated with a second individual. In some implementations, the first and second display content data is generated by a rendering system based on corresponding rendering characteristics, such as is described with reference to block 514 of FIG. 5. In some implementations, the first and second display content data are generated independently of any rendering characteristics.

As represented by block 604, in some implementations, the method 600 includes obtaining environmental data from an environmental sensor (e.g., the environmental sensor(s) 310 of FIG. 3). Various examples regarding the environmental data are provided with reference to block 502 of FIG. 5.

As represented by block 606, the method 600 includes determining a first display operation parameter based on a first viewing angle of the first individual with respect to the display, and determining a second display operation parameter based on a second viewing angle of the second individual with respect to the display. A particular display operation parameter may indicate a display quality associated with the display of corresponding display content data. For example, a particular display operation parameter is proportional to the display quality. In some implementations, a particular display operation parameter has an inverse relationship with respect to a corresponding viewing angle. For example, comparing the example described with reference to FIGS. 2H and 2I against the example described with reference to FIGS. 2J and 2K, as the viewing angle associated with the second individual increases 230, the electronic device 210 correspondingly reduces a display operation parameter associated with the second individual 230. Thus, in FIG. 2K the display 212 includes a lower quality basketball than the basketball displayed in FIG. 2I. For example, with reference to FIG. 2K, a display controller turns off certain pixels of the display 212, thereby saving display resources.

As represented by block 608, in some implementations, the first display operation parameter indicates a first display frame rate, and the second display operation parameter indicates a second display frame rate that is different from the first display frame rate. For example, a particular display frame rate indicates a frames per second (FPS) value. In some implementations, a particular display frame rate is inversely proportional to a corresponding viewing angle. For example, as an individual moves closer to the center of a viewable region associated with a display of an electronic device, the electronic device increases a corresponding display frame rate of display content data viewable by the individual.

As represented by block 610, in some implementations, the first display operation parameter corresponds to a first illumination level associated with a first subset of pixels of a display, and the second display operation parameter corresponds to a second illumination level associated with a second subset of pixels of the display. For example, the first subset of pixels is viewable by the first individual, and the second subset of pixels is viewable by the second individual. In some implementations, a particular illumination level is inversely proportional to a corresponding viewing angle. For example, as an individual moves away from the center of a viewable region associated with a display of an electronic device, the electronic device reduces a corresponding illumination level of display content data viewable by the individual.

As represented by block 612, in some implementations, the first display operation parameter is further based on a first depth of the first individual with respect to the display, and the second display operation parameter is further based on a second depth of the second individual with respect to the display. To that end, in some implementations, the method 600 includes obtaining or determining the first and second depths. For example, the method 600 includes obtaining, from a depth sensor, depth data that indicates the first and second depths. As another example, the method 600 includes determining (e.g., via a computer vision technique) the first and second depths based on image data from an image sensor. In some implementations, the first display operation parameter has an inverse relationship with respect to the first depth, and the second display operation parameter has an inverse relationship with respect to the second depth. For example, with reference to FIG. 2B, the electronic device 210 obtains the first depth 226 associated with the first individual 220, and obtains the second depth 236 associated with the second individual 230. The electronic device 210 further determines that the first depth 226 is greater than the second depth 236, and accordingly determines a first display operation parameter (associated with the first individual 220) that is less than a second display operation parameter (associated with the second individual 230). Based on the difference between the first and second display operation parameters, the electronic device 210 may display the first display content data 242 at a lower display frame rate and/or at a lower illumination level than display of the second display content data 240.

As represented by block 614, in some implementations, the first display operation parameter is further based on a first engagement level associated with the first individual, and the second display operation parameter is further based on a second engagement level associated with the second individual. For example, the first engagement level is based on a movement characteristic associated with the first individual, and the second engagement level is based on a movement characteristic associated with the second individual. As another example, the first engagement level is based on a pose characteristic associated with the first individual, and the second engagement level is based on a pose characteristic associated with the second individual. As yet another example, the first engagement level is based on a characteristic of an eye of the first individual, and wherein the second engagement level is based on a characteristic of an eye of the second individual. Various examples of utilizing engagement scores are described with reference to the engagement score generator 350 illustrated in FIG. 3.

As represented by block 616, the method 600 includes displaying the first display content data according to the first display operation parameter, and displaying the second display content data according to the second display operation parameter. For example, the method 600 includes concurrently displaying the first and second display content data. In some implementations, displaying the first display content data according to the first display operation parameter is associated with a first display resource utilization value, and displaying the second display content data according to the second display operation parameter is associated with a second display resource utilization value different from the first display resource utilization value. In some implementations, displaying the first display content data according to the first display operation parameter includes displaying a first plurality of images at the first display rate, and displaying the second display content data according to the second display operation parameter includes displaying a second plurality of images at the second display rate. In some implementations, the method 600 may include displaying image frames of corresponding display content data according to the FPS value.

In some implementations, the method 600 is performed at an electronic device including a display, such as a lenticular display. Moreover, the method 600 includes displaying the first display content data on a first subset of pixels of the display, and displaying the second display content data on a second subset of the pixels. For example, with reference to block 610, displaying the first display content data according to the first display operation parameter includes setting the first subset of the pixels to the first illumination level, and displaying the second display content data according to the second display operation parameter includes setting the second subset of the pixels to the second illumination level. In some implementations, in response to determining that (a portion of or the entirety of) the first individual ceases to be within a viewable region associated with the display, the method 600 includes reducing the first illumination level for a portion of the first subset of the pixels. Reducing the first illumination level for the portion of the first subset of the pixels may include turning off the portion of the first subset of the pixels. In some implementations, in response to determining that the first individual ceases to be within the viewable region for at least a threshold amount of time, the method 600 includes turning off the entirety of the first subset of the pixels.

As represented by block 618, in some implementations, the method 600 includes detecting a change from the first viewing angle to a third viewing angle. As represented by block 620, detecting the change may be based on a combination of the environmental data and positional sensor data. For example, with reference to FIGS. 2H-2J, the electronic device 210 detects a change from the third viewing angle $\theta_3$ to the fourth viewing angle $\theta_4$, based on environmental data—e.g., the electronic device 210 performs a computer vision technique with respect to the environmental data in order to track the rightwards movement of the second individual 230. As another example, based on positional sensor data from a positional sensor (e.g., the positional sensor 330 in FIG. 3), an electronic device determines the change in viewing angle.

As represented by block 622, in some implementations, in response to detecting the change, the method 600 includes determining a third display operation parameter based on the third viewing angle. For example, with reference to FIGS. 2H-2J, based on detecting the change from the third viewing angle $\theta_3$ to the fourth viewing angle $\theta_4$, the electronic device 210 reduces the display operation parameter because the updated position of the second individual 230 is nearer to the edge of the viewable region 214. Accordingly, as represented by block 624, method 600 may include ceasing to display the first display content data according to the first display operation parameter, and displaying the first display content data according to the third display operation parameter.

In some implementations, the method 600 includes determining that the first individual ceases to be within a viewable region associated with the display. Moreover, in response to determining that the first individual ceases to be within the viewable region, the method 600 includes ceasing to display the first display content data, and continuing to display the second display content data according to the second display operation parameter. For example, with reference to FIG. 2L, the electronic device 210 determines that the second individual 230 moves outside of the viewable region 214. Accordingly, the electronic device 210 ceases to display the fifth display content data 258 (the basketball), as illustrated in FIG. 2M.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
at an electronic device including one or more processors, a non-transitory memory, a rendering system, and a display:
determining a first rendering characteristic based on a first viewing angle of a first individual with respect to the display, wherein the first rendering characteristic has an inverse relationship with respect to the first viewing angle;
determining a second rendering characteristic based on a second viewing angle of a second individual with respect to the display, wherein the first rendering characteristic is different from the second rendering characteristic, and wherein the second rendering characteristic has an inverse relationship with respect to the second viewing angle; and
generating, via the rendering system, first display content data according to the first rendering characteristic, and generating, via the rendering system, second display content data according to the second rendering characteristic, wherein the first display content data is associated with the first viewing angle, and wherein the second display content data is associated with the second viewing angle.

2. The method of claim 1, wherein generating the first display content data according to the first rendering characteristic is associated with a first rendering resource utilization value, and wherein generating the second display content data according to the second rendering characteristic is associated with a second rendering resource utilization value different from the first rendering resource utilization value.

3. The method of claim 1, wherein the first rendering characteristic indicates a first resolution value, and wherein the second rendering characteristic indicates a second resolution value that is different from the first resolution value.

4. The method of claim 3, wherein generating the first display content data according to the first rendering characteristic includes generating a first image associated with the first resolution value, and wherein generating the second display content data according to the second rendering characteristic includes generating a second image associated with the second resolution value.

5. The method of claim 1, wherein the first rendering characteristic indicates a first rendering frequency, and wherein the second rendering characteristic indicates a second rendering frequency that is different from the first rendering frequency.

6. The method of claim 1, further comprising displaying, on the display, the first display content data and the second display content data.

7. The method of claim 6, wherein the display includes a lenticular lens.

8. The method of claim 1, further comprising determining a first depth of the first individual with respect to the display, and determining a second depth of the second individual with respect to the display, wherein determining the first rendering characteristic is further based on the first depth, and wherein determining the second rendering characteristic is further based on the second depth.

9. The method of claim 8, wherein the first rendering characteristic has an inverse relationship with respect to the first depth, and wherein the second rendering characteristic has an inverse relationship with respect to the second depth.

10. The method of claim 1, wherein the first rendering characteristic is further based on a first engagement level associated with the first individual, and wherein the second rendering characteristic is further based on a second engagement level associated with the second individual.

11. The method of claim 10, wherein the first engagement level is based on a movement characteristic associated with the first individual, and wherein the second engagement level is based on a movement characteristic associated with the second individual.

12. The method of claim 10, wherein the first engagement level is based on a pose characteristic associated with the first individual, and wherein the second engagement level is based on a pose characteristic associated with the second individual.

13. The method of claim 10, further comprising:
determining a characteristic of an eye of the first individual; and
determining a characteristic of an eye of the second individual;
wherein the first engagement level is based on the characteristic of the eye of the first individual, and wherein the second engagement level is based on the characteristic of the eye of the second individual.

14. The method of claim 1, wherein the electronic device includes an environmental sensor, the method further comprising determining the first and second viewing angles based on environmental data from the environmental sensor.

15. The method of claim 1, further comprising:
detecting a change from the first viewing angle to a third viewing angle of the first individual with respect to the display; and
in response to detecting the change:
determining a third rendering characteristic based on the third viewing angle;
ceasing to generate the first display content data according to the first rendering characteristic; and
generating third display content data according to the third rendering characteristic.

16. The method of claim 1, further comprising, in response to determining that the first individual ceases to be within a viewable region associated with the display:
ceasing to generate the first display content data; and
continuing to generate the second display content data according to the second rendering characteristic.

17. A first system comprising:
a display;
a rendering characteristics generator to:
determine a first rendering characteristic based on a first viewing angle of a first individual with respect to the display, wherein the first rendering characteristic has an inverse relationship with respect to the first viewing angle, and
determine a second rendering characteristic based on a second viewing angle of a second individual with respect to the display, wherein the first rendering characteristic is different from the second rendering characteristic, and wherein the second rendering characteristic has an inverse relationship with respect to the second viewing angle; and
a rendering system to generate first display content data according to the first rendering characteristic, and generate second display content data according to the second rendering characteristic, wherein the first display content data is associated with the first viewing angle, and wherein the second display content data is associated with the second viewing angle.

18. The first system of claim 17, wherein the display includes a lenticular lens that enables the first display content data to be viewable on the display by the first individual, and enables the second display content data to be viewable on the display by the second individual.

19. The first system of claim 17, wherein the first rendering characteristic indicates a first rendering frequency, and wherein the second rendering characteristic indicates a second rendering frequency that is different from the first rendering frequency.

20. A non-transitory computer readable storage medium storing one or more programs, the one or more programs comprising instructions, which, when executed by an electronic device including a rendering system and a display, cause the electronic device to:
  determine a first rendering characteristic based on a first viewing angle of a first individual with respect to the display, wherein the first rendering characteristic has an inverse relationship with respect to the first viewing angle;
  determine a second rendering characteristic based on a second viewing angle of a second individual with respect to the display, wherein the first rendering characteristic is different from the second rendering characteristic, and wherein the second rendering characteristic has an inverse relationship with respect to the second viewing angle; and
  generate, via the rendering system, first display content data according to the first rendering characteristic, and generate, via the rendering system, second display content data according to the second rendering characteristic, wherein the first display content data is associated with the first viewing angle, and wherein the second display content data is associated with the second viewing angle.

* * * * *